(12) United States Patent
Kreidler et al.

(10) Patent No.: US 9,985,494 B2
(45) Date of Patent: May 29, 2018

(54) ELECTRICAL MACHINE AND CONTROLLER AND METHODS OF ASSEMBLING THE SAME

(71) Applicant: Regal Beloit America, Inc., Beloit, WI (US)

(72) Inventors: Jason Jon Kreidler, Sheboygan Falls, WI (US); Rafal Pawel Rohoza, Fort Wayne, IN (US); Norman Carl Golm, Jr., Fort Wayne, IN (US); David Bruce Hyypio, Wausau, WI (US); Marc McKinzie, West Milton, OH (US); Mark Lyon Klopp, Fort Wayne, IN (US)

(73) Assignee: Regal Beloit America, Inc., Beloit, WI (US)

( * ) Notice: Subject to any disclaimer, the term of this patent is extended or adjusted under 35 U.S.C. 154(b) by 709 days.

(21) Appl. No.: 14/480,310

(22) Filed: Sep. 8, 2014

(65) Prior Publication Data

US 2016/0072359 A1    Mar. 10, 2016

(51) Int. Cl.
*H02K 11/00*         (2016.01)
*H02K 5/20*          (2006.01)
(Continued)

(52) U.S. Cl.
CPC .............. *H02K 5/22* (2013.01); *F04D 17/08* (2013.01); *F04D 17/16* (2013.01); *F04D 25/06* (2013.01); *F04D 25/068* (2013.01); *F04D 25/082* (2013.01); *F04D 29/28* (2013.01); *H02K 5/00* (2013.01); *H02K 5/1735* (2013.01); *H02K 5/18* (2013.01); *H02K 7/14* (2013.01); *H02K 11/0068* (2013.01); *H02K 11/04* (2013.01); *H02K 11/33* (2016.01); *H02K 15/02* (2013.01);
(Continued)

(58) Field of Classification Search
CPC ........... H02K 11/33; H02K 9/22; H02K 5/225
USPC ................. 310/64, 68 D, 68 R, 68 B, 71, 89
See application file for complete search history.

(56) References Cited

U.S. PATENT DOCUMENTS

| 3,296,827 A | 1/1967 | Landon, Jr. |
| 4,210,833 A | 7/1980 | Neveux |

(Continued)

FOREIGN PATENT DOCUMENTS

| CN | 103343754 A | 10/2013 |
| DE | 19546040 A1 | 6/1996 |

(Continued)

OTHER PUBLICATIONS

Non-Final Office Action, U.S. Appl. No. 14/480,322, filed Sep. 8, 2014, dated Sep. 23, 2016, 30 pages.
(Continued)

*Primary Examiner* — Jose Gonzalez Quinones
(74) *Attorney, Agent, or Firm* — Armstrong Teasdale LLP

(57) ABSTRACT

A fluid circulating assembly includes an electrical machine having a rotor assembly, a stator assembly, and a housing. The housing includes an annular center section and at least two extension portions extending radially outward from the annular center section of the housing. The fluid circulating assembly also includes a controller assembly coupled to the housing. The said controller assembly is positioned radially outward from the stator assembly and located in at least one of the at least two extension portions.

20 Claims, 19 Drawing Sheets

(51) Int. Cl.

| | |
|---|---|
| H02K 5/22 | (2006.01) |
| H02K 21/24 | (2006.01) |
| F04D 17/08 | (2006.01) |
| F04D 25/06 | (2006.01) |
| F04D 29/28 | (2006.01) |
| H02K 11/04 | (2016.01) |
| H02K 15/02 | (2006.01) |
| H02K 5/00 | (2006.01) |
| H02K 5/173 | (2006.01) |
| H02K 5/18 | (2006.01) |
| H02K 7/14 | (2006.01) |
| H02K 11/33 | (2016.01) |
| F04D 17/16 | (2006.01) |
| F04D 25/08 | (2006.01) |

(52) U.S. Cl.
CPC ............ *H02K 21/24* (2013.01); *H02K 5/225* (2013.01); *H02K 2211/03* (2013.01)

(56) References Cited

U.S. PATENT DOCUMENTS

| | | |
|---|---|---|
| 4,292,557 A | 9/1981 | Kishi |
| 4,806,080 A | 2/1989 | Mizobuchi et al. |
| 5,128,571 A | 7/1992 | Itsu |
| 5,226,593 A | 7/1993 | Beryozkin |
| 5,591,016 A | 1/1997 | Kubota et al. |
| 5,947,191 A | 9/1999 | Hiteshew et al. |
| 6,552,452 B2 | 4/2003 | Ferguson |
| 6,602,058 B1 | 8/2003 | Stewart |
| 6,897,580 B2 | 5/2005 | White |
| 6,899,516 B2 | 5/2005 | Wang |
| 7,029,244 B2 | 4/2006 | Anderson |
| 7,976,293 B2 * | 7/2011 | Kusano .................... F01D 1/02 417/423.1 |
| 8,596,596 B2 | 12/2013 | Naji et al. |
| 2002/0039529 A1 | 4/2002 | Kim |
| 2003/0161722 A1 | 8/2003 | Galassi |
| 2007/0039529 A1 | 2/2007 | Sauder et al. |
| 2007/0253806 A1 | 11/2007 | Russell |
| 2007/0273220 A1 * | 11/2007 | Koyama ................ H02K 5/20 310/58 |
| 2009/0079281 A1 * | 3/2009 | Best ....................... H02K 11/33 310/71 |
| 2009/0142203 A1 * | 6/2009 | De Filippis ........... F04D 25/082 417/353 |
| 2011/0043082 A1 | 2/2011 | Billmann |
| 2011/0204734 A1 | 8/2011 | Orlowski |
| 2011/0240026 A1 | 10/2011 | Ausen |
| 2013/0315752 A1 * | 11/2013 | Blaser ................. F04D 15/0218 417/45 |
| 2013/0343935 A1 | 12/2013 | Hoj |
| 2014/0009016 A1 * | 1/2014 | Seidenbinder .......... H01L 25/16 310/64 |
| 2014/0021810 A1 | 1/2014 | Figgins et al. |
| 2014/0217844 A1 | 8/2014 | Cocks et al. |
| 2014/0265664 A1 | 9/2014 | Camilleri et al. |

FOREIGN PATENT DOCUMENTS

| | | |
|---|---|---|
| DE | 102005032970 B3 | 9/2006 |
| DE | 102013203500 A1 | 9/2014 |
| EP | 1338798 A2 | 8/2003 |
| EP | 2500575 A1 | 9/2012 |
| JP | 2005017794 A * | 1/2005 |
| JP | 2006217748 A | 8/2006 |

OTHER PUBLICATIONS

EP Extended Search Report Application No. 15184358.8-1808, dated Oct. 7, 2016, 9 pages.
Extended European Search Report, Application No. 15184359.6-1607, dated Jan. 20, 2016.
Extended European Search Report, Appln. 15184345.5-1806/2993769 dated May 13, 2016; 8 pages.
Air Cleaning Specialists, Inc., "Fume-A-Vent PB 9 Series", Pressure Blowers, Jul. 12, 3 pages.
ID Cooling Limited, "Installation Guide", Cooling LAG2011, 1 page.
ID Cooling Limited, "Installation Guide", Cooling LGS2011, 1 page.
Power-Strut, "Power-Strut Engineering Catalog", 2007, 172 pages.

* cited by examiner

ELECTRICAL MACHINE AND CONTROLLER AND METHODS OF ASSEMBLING THE SAME

BACKGROUND

The embodiments described herein relate generally to electrical machines, and more particularly, to an axial flux electrical machine including an integrated controller for use in fluid circulating systems.

Many known commercial heating, ventilation, and air conditioning (HVAC) systems require air propulsion units. In addition to providing movement of air for HVAC systems, air propulsion units may be used in combination with condenser units and to supplement other heat transfer operations. Some known air propulsion units include motor driven fans. These fans include, for example, a centrifugal impeller type fan driven by a radial flux motor. However, some known radial flux motors and their mounting components extend a certain distance into the fan cavity. This restricts air flow through the fan and yields aerodynamic losses that adversely affect fan performance.

Moving the air propulsion unit outside of the fan cavity causes an overall thickness of the assembly to increase significantly and further requires that the fan be attached to a shaft of the motor using various coupling mechanisms attached to the fan. These known coupling mechanisms further add to the fan assembly thickness and introduce weight and complexity to the fan assembly. Furthermore, the cost is increased in such fan assemblies due to the increased part count required for coupling the fan to the motor shaft.

In addition, many known air propulsion units include an integrated controller attached to an end of the unit, thereby further increasing the thickness of the fan assembly. To reduce the thickness of the air propulsion unit, many known units include complex controller board arrangements and layout that can add cost and complexity to the unit, and introduce localized heating from the heat generating components that is not adequately dissipated.

BRIEF DESCRIPTION

In one aspect, a fluid circulating assembly is provided. The fluid circulating assembly includes an electrical machine having a rotor assembly, a stator assembly, and a housing. The housing includes an annular center section and at least two extension portions extending radially outward from the annular center section. The fluid circulating assembly also includes a controller assembly coupled to the housing. The controller assembly is positioned radially outward from the stator assembly and located in at least one of the at least two extension portions.

In another aspect, a method of assembling a fluid circulating assembly is provided. The method includes providing an electrical machine having a rotor assembly, a stator assembly, and a housing. The housing includes an annular center section and at least two extension portions extending radially outward from the annular center section. The method also includes coupling a controller assembly to the housing. The controller assembly is positioned radially outward from the stator assembly and located in at least one of the at least two extension portions.

Although specific features of various embodiments may be shown in some drawings and not in others, this is for convenience only. Any feature of any drawing may be referenced and/or claimed in combination with any feature of any other drawing.

DETAILED DESCRIPTION

Figure 1:
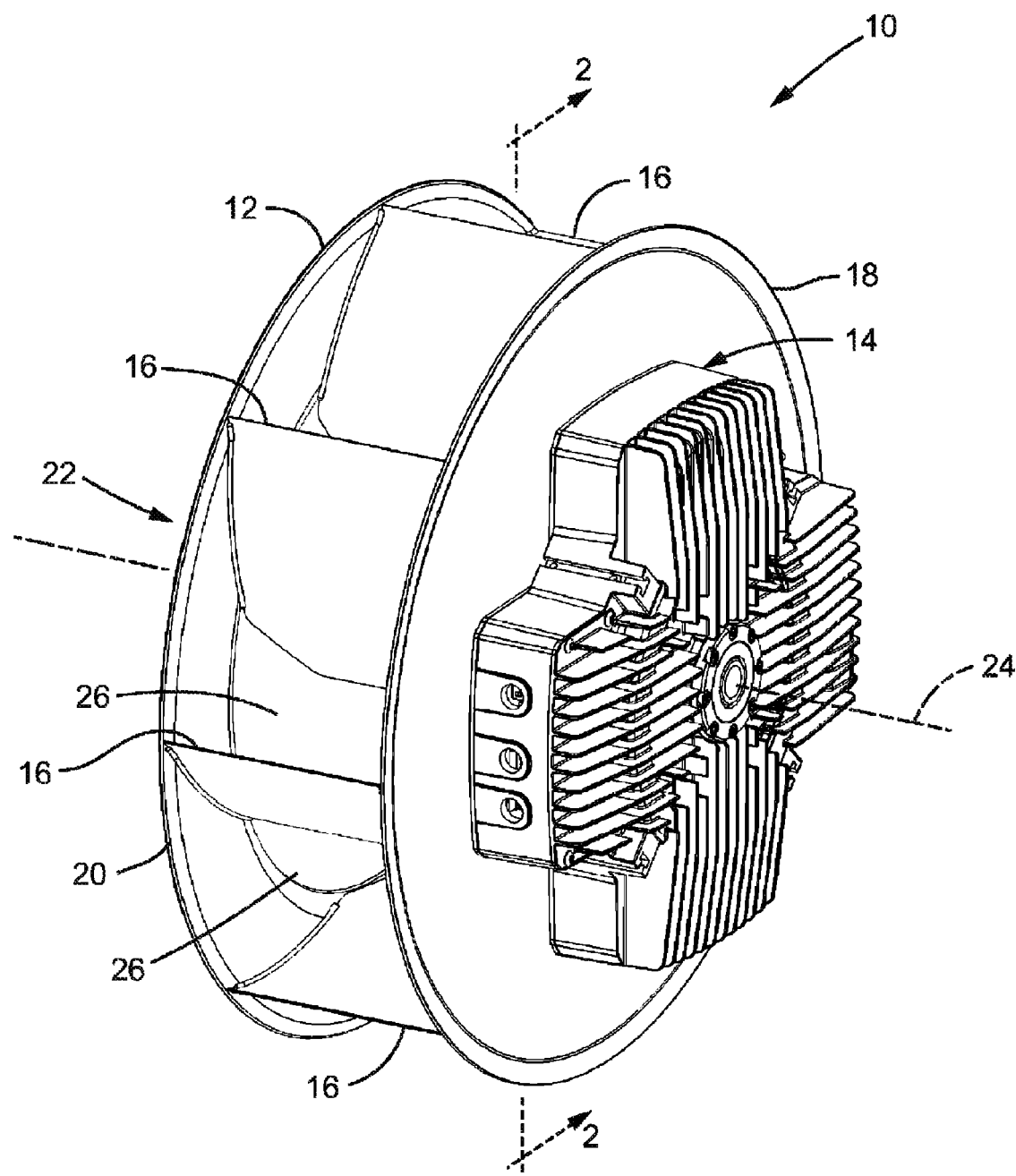
FIG. 1 is a schematic perspective of an exemplary fluid circulating assembly.
Figure 2:
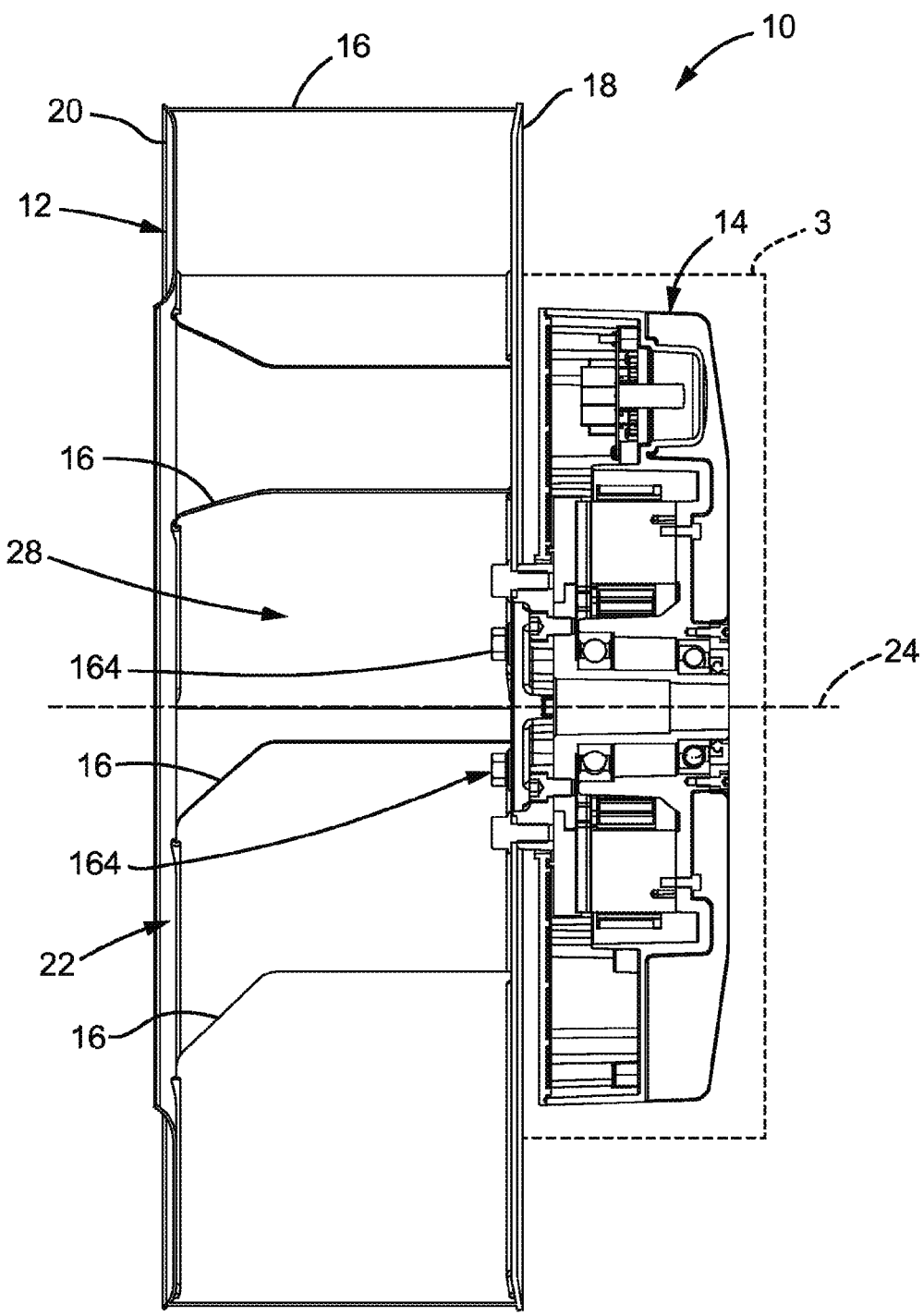
FIG. 2 is a cross-sectional view of the fluid circulating assembly taken along line 2-2 of FIG. 1.

FIG. 1 is a schematic perspective of an exemplary fluid circulating assembly 10. FIG. 2 is a cross-sectional view of fluid circulating assembly 10 taken along line 2-2 of FIG. 1. In the exemplary embodiment, fluid circulating assembly 10 generates a flow of air in a forced air system, for example, without limitation, a residential or commercial heating, ventilation, and air conditioning (HVAC) system. Alternatively, fluid circulating assembly 10 generates a fluid flow in any type of fluid circulating system that enables fluid circulating assembly 10 to function as described herein. In the exemplary embodiment, fluid circulating assembly 10 includes a fan impeller 12 coupled to an electrical machine 14. In the exemplary embodiment, electrical machine 14 is an electric motor, and more specifically, an axial flux electric motor, although, electrical machine 14 may function as either an electric motor or an electric generator. Furthermore, fan impeller 12 is a centrifugal fan impeller, although, impeller 12 can be a pump impeller.

In the exemplary embodiment, fan impeller 12 includes a plurality of fan blades 16 (blades). Blades 16 are attached between a rear plate 18 and an inlet ring 20 (or front plate). Inlet ring 20 includes a central air inlet 22. In the exemplary embodiment, fan impeller 12 is a backward curved plug fan. Alternatively, fan impeller 12 may have any suitable blade shape or configuration that enables fluid circulating assembly 10 to operate as described herein, for example, without limitation, a backward curved blade, an airfoil blade, a backward inclined blade, a forward curved blade, and a radial blade.

In the exemplary embodiment, rear plate 18 and inlet ring 20 are coaxial, or substantially coaxial, and rotate about a center axis 24. Blades 16 are attached to rear plate 18 and/or inlet ring 20 such that each blade 16 extends between rear plate 18 and inlet ring 20. In the exemplary embodiment, each blade 16 is attached to rear plate 18 and inlet ring 20 by mechanical bonding, such as welding. Alternatively, each blade 16 is attached to rear plate 18 and/or inlet ring 20 via mechanical fasteners, for example, without limitation, rivets, or via features formed in rear plate 18 and/or inlet ring 20 such as an opening, for example, without limitation, a groove or a slot configured to restrict an amount of movement of blade 16 between rear plate 18 and inlet ring 20 while enabling each blade 16 to operate as described herein.

In the exemplary embodiment, during operation, air enters fluid circulating assembly 10 substantially axially along center axis 24 through central air inlet 22 and is deflected radially outward toward blades 16. Blades 16 are configured to draw the air through inlet 22 into a central chamber 28 of fan impeller 12, i.e., blades 16 pull in air along center axis 24 and eject the air radially outward through outlet channels 26, where each outlet channel 26 is located between adjacent blades 16. The air passes between blades 16 and is pushed outward through outlet channels 26 due to centrifugal force generated by the rotating blades 16. Blades 16 are suitably fabricated from any number of materials, including sheet metal, plastic, or a flexible or compliant material. Alternatively, blades 16 are fabricated from a combination of materials such as attaching a flexible or compliant material to a rigid material, or any suitable material or material combination that enables blades 16 to operate as described herein.

Figure 3:
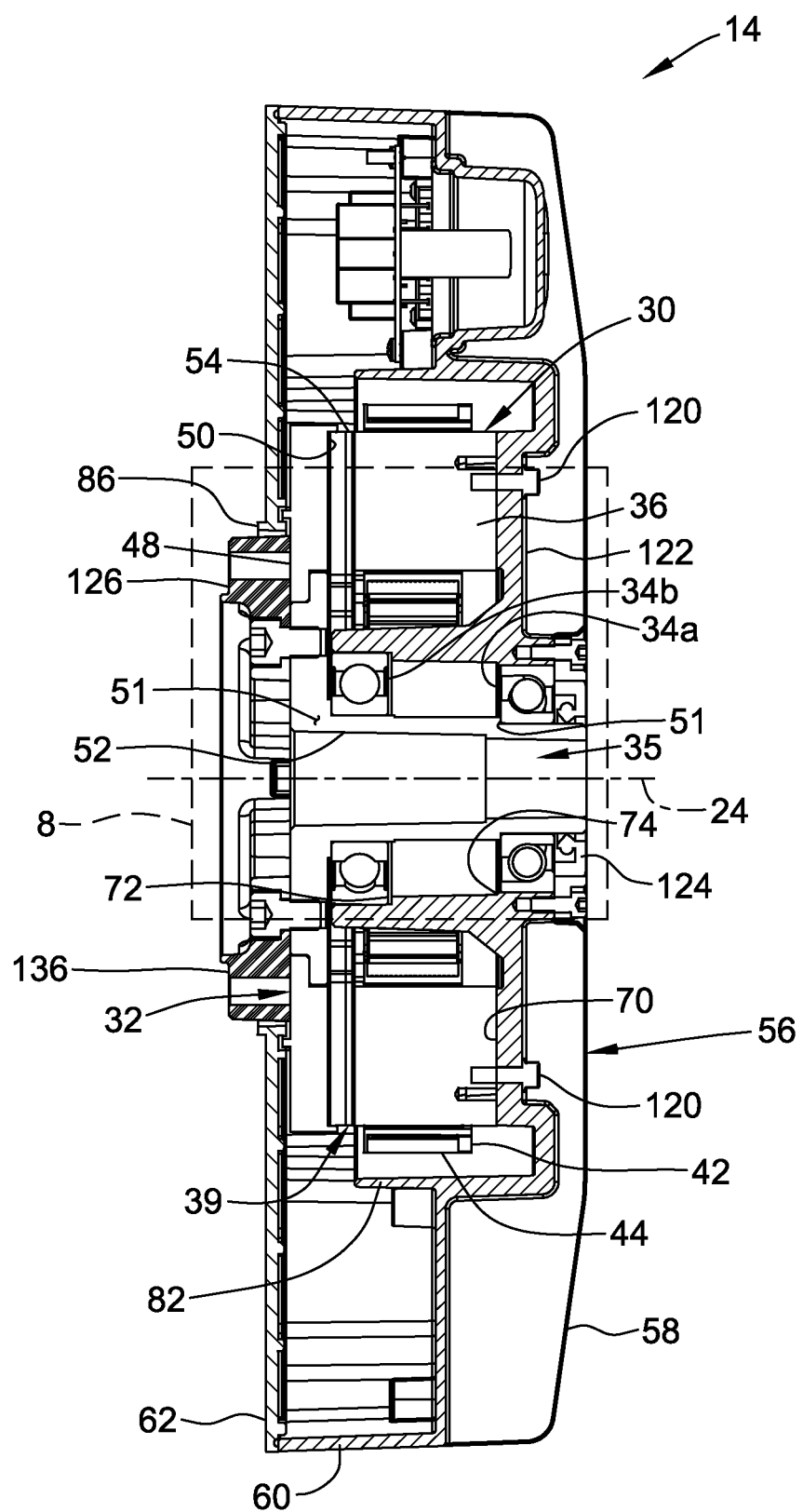
FIG. 3 is an enlarged view of a portion of FIG. 2 identified by box 3, showing an electrical machine of the fluid circulating assembly without a fan impeller.
Figure 4:
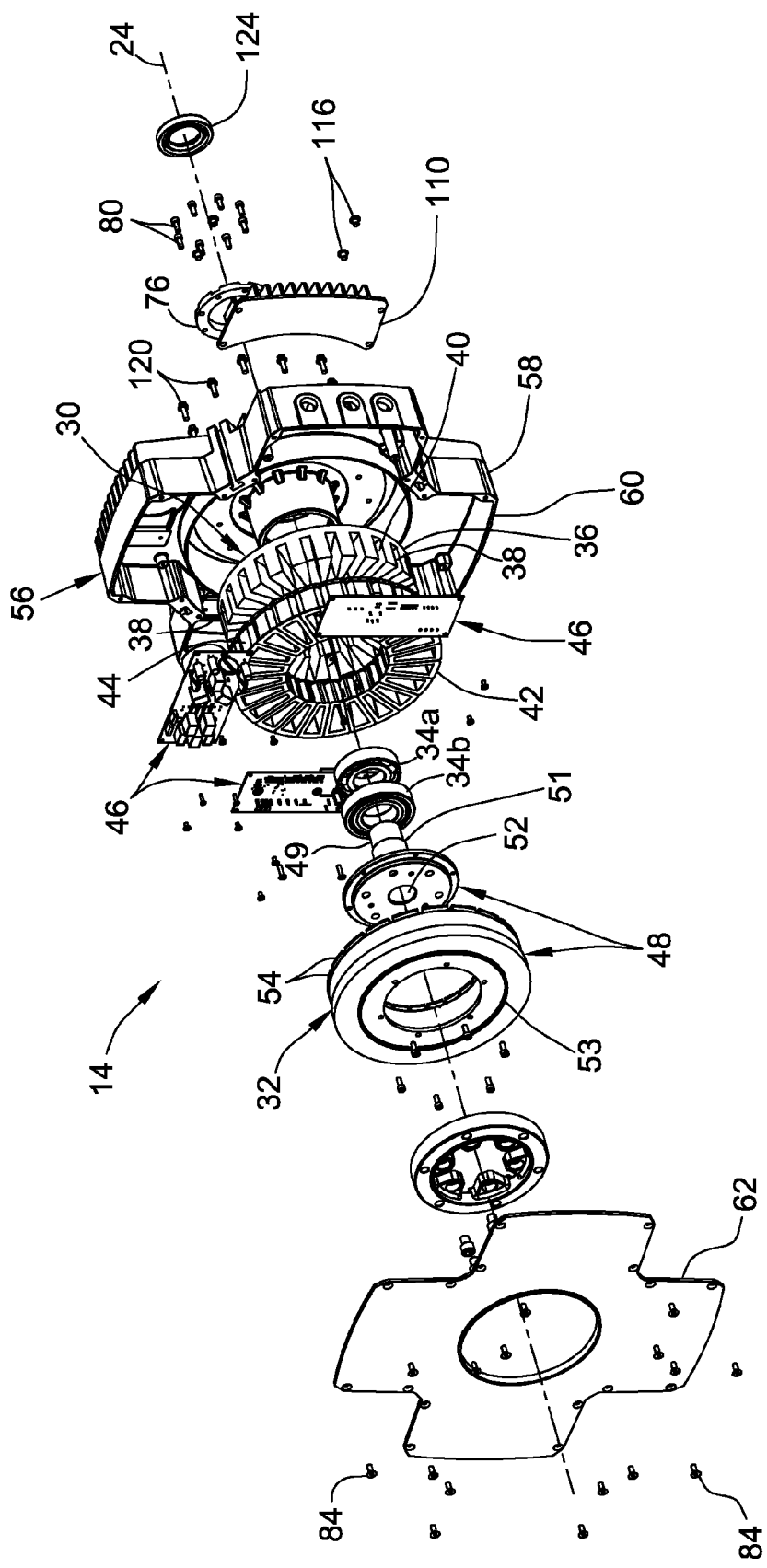
FIG. 4 is an exploded view of the electrical machine shown in FIG. 3.

FIG. 3 is an enlarged view of a portion of FIG. 2 identified by box 3, showing electrical machine 14 without fan impeller 12. FIG. 4 is an exploded view of electrical machine 14. In the exemplary embodiment, electrical machine 14 is an axial flux electric motor configured to rotate fan impeller 12 about center axis 24. Electrical machine 14 includes a stator assembly 30, a rotor assembly 32, and a pair of bearing assemblies 34a, 34b coupled radially therebetween. Stator assembly 30, rotor assembly 32, and bearing assemblies 34a, 34b are positioned concentrically, each including a central opening 35 oriented about center axis 24.

Stator assembly 30 includes a stator core 36 that includes a plurality of circumferentially-spaced stator teeth 38 that extend axially, substantially parallel to center axis 24. In the exemplary embodiment, stator core 36 is a laminated core. As defined herein, the laminated core is radially laminated, e.g., fabricated with a ribbon of material wound into a core, or a series of concentric rings stacked one inside the other to create a core of material, for example, soft iron or silicon steel. Alternatively, stator core 36 may be a solid core stator. A solid core can be a complete, one-piece component, or can include multiple non-laminated sections coupled together to form a complete solid core. Stator core 36 is fabricated from a magnetic material, such as, for example, a Soft Magnetic Alloy (SMA) or a Soft Magnetic Composite (SMC) material. Alternatively, stator core 36 is fabricated from any ferromagnetic material that enables electrical machine 14 to function as described herein, such as, for example, steel or a steel alloy. The use of SMA or SMC materials in a solid core enable 3-dimensional flux paths and facilitate reducing high frequency losses (e.g., losses at frequencies above 60 Hz) when compared with laminated stator cores. The use of SMC or SMA materials also facilitates increasing control of an air gap 39, which facilitates improving performance and minimizing noise.

Between each pair of adjacent stator teeth 38 is a slot 40. Each stator tooth 38 is configured to receive one of a plurality of insulating bobbins 42 that includes a copper winding 44 would around an outer surface of each respective bobbin 42. Alternatively, each stator tooth 38 includes copper winding 44 without bobbin 42. Electrical machine 14 can include one copper winding 44 per stator tooth 38 or one copper winding 44 positioned on every other stator tooth 38. Copper windings 44 are electrically coupled to a controller assembly 46 for receiving electrical current thereby inducing an electromagnetic field about a pole of stator core 36. Controller assembly 46 is configured to apply a voltage to one or more of copper windings 44 at a time for commutating copper windings 44 in a preselected sequence to rotate rotor assembly 32 about center axis 24. In the exemplary embodiment, electrical current is a three-phase alternating current (AC). Alternatively, the current is any type of electrical current that enables electrical machine 14 to function as described herein. In the exemplary embodiment, controller assembly 46 functions to both accelerate and decelerate rotor assembly 32.

In the exemplary embodiment, rotor assembly 32 includes a rotor disk assembly 48 having an axially inner surface 50 and a radially inner wall 52 that at least partially defines opening 35. Rotor assembly 32 also includes a plurality of permanent magnets 54 coupled to inner surface 50 of rotor disk assembly 48. In one suitable embodiment, magnets 54 are coupled to rotor disk assembly 48 using an adhesive. Alternatively, magnets 54 are coupled to rotor disk assembly 48 by a magnet retaining ring or any other retention method that enables electrical machine 14 to function as described herein. In the exemplary embodiment, permanent magnets 54 are symmetrical, which facilitates manufacturing by enabling a single magnet design for use with each magnet 54. Furthermore, each magnet 54 has a substantially flat profile which facilitates reducing waste during manufacturing, and therefore, facilitates reducing manufacturing cost. In the exemplary embodiment, permanent magnets 54 are neodymium magnets. Alternatively, any suitable permanent magnet material may be included that enables electrical machine 14 to function as described herein, for example, without limitation, Samarium Cobalt and Ferrite. Rotor assembly 32 is rotatable within electrical machine 14, and more specifically, rotatable within bearing assemblies 34a, 34b about center axis 24.

In the exemplary embodiment, rotor disk assembly 48 is fabricated from a solid metal material, for example, without limitation, steel or iron. Alternatively, rotor disk assembly 48 is fabricated from, for example, an SMA material, an SMC material, or a powdered ferrite material, using a sintering process. Similarly, as described above, stator core 36 is fabricated from a material that enables magnetic attraction between permanent magnets 54 and stator core 36 to facilitate retaining rotor disk assembly 48 and bearing assemblies 34a, 34b in place within electrical machine 14 such that electrical machine 14 does not require a shaft. Rotor disk assembly 48 includes a shaft portion 49 that includes a step 51 configured to facilitate holding bearing assembly 34a in place. Shaft portion 49 includes a diameter (not shown) configured to corresponding a diameter of bearing assemblies 34a, 34b. Furthermore, rotor disk assembly 48 includes a ring-shaped axially extending flange 53 that extends outward from rotor disk assembly 48 toward fan impeller 12 (not shown in FIG. 4).

In the exemplary embodiment, electrical machine 14 includes housing 56 configured to provide a protective covering for electrical machine 14 and controller assembly 46. In the exemplary embodiment, housing 56 includes an endshield 58 having an integrated flange 60 that extends axially towards rear plate 18 of fan impeller 12 (shown in FIGS. 1 and 2) from a perimeter of endshield 58. Furthermore, housing 56 includes a cover plate 62 that is configured to couple to flange 60, thereby enclosing components of electrical machine 14 within housing 56. Housing 56 is configured to maintain a stationary position of stator assembly 30, bearing assemblies 34a, 34b, and controller assembly 46 during rotation of fan impeller 12 and rotor assembly 32.

Figure 5:
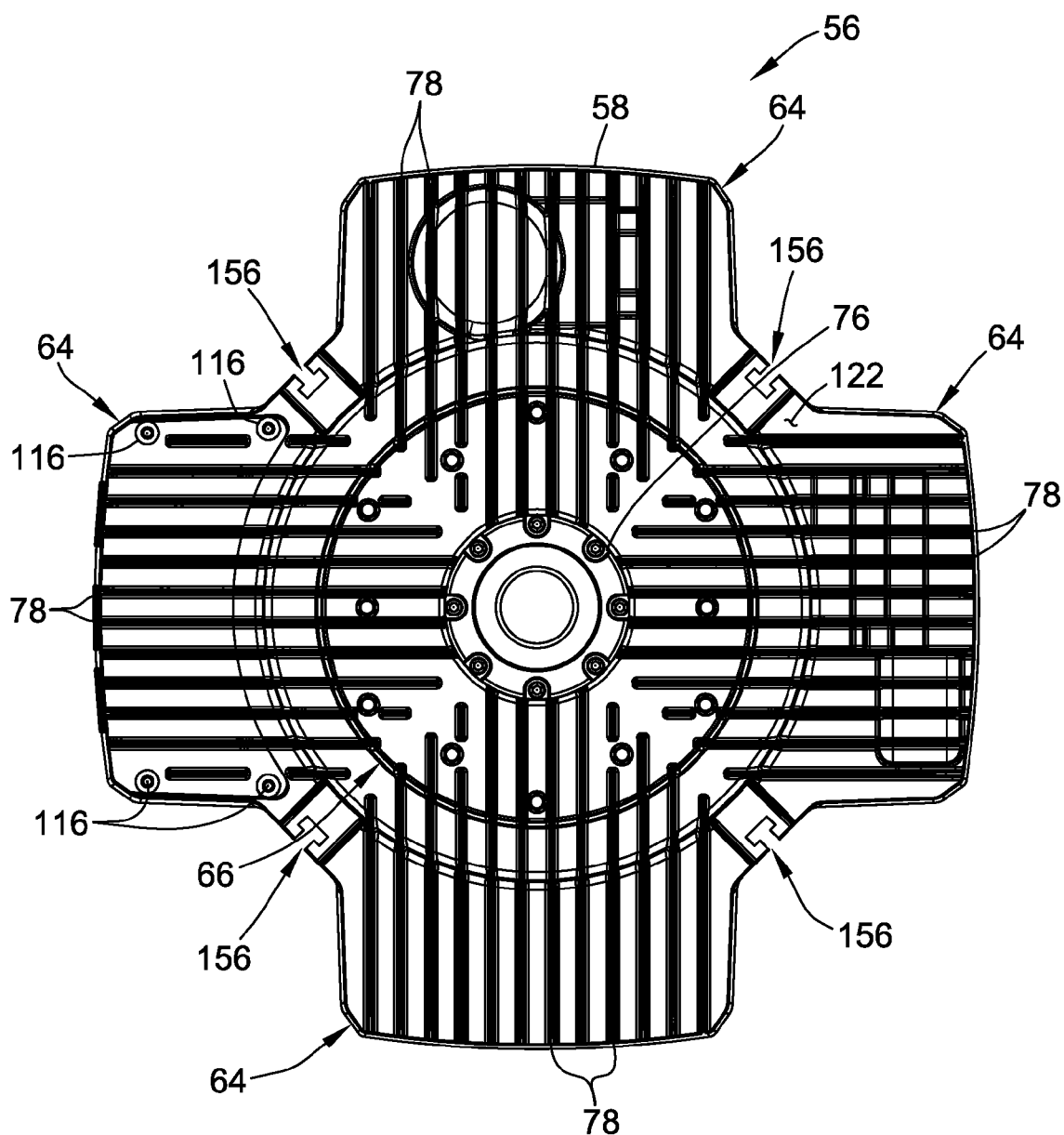
FIG. 5 is an end view of a housing looking axially along a center axis toward an endshield.
Figure 6:
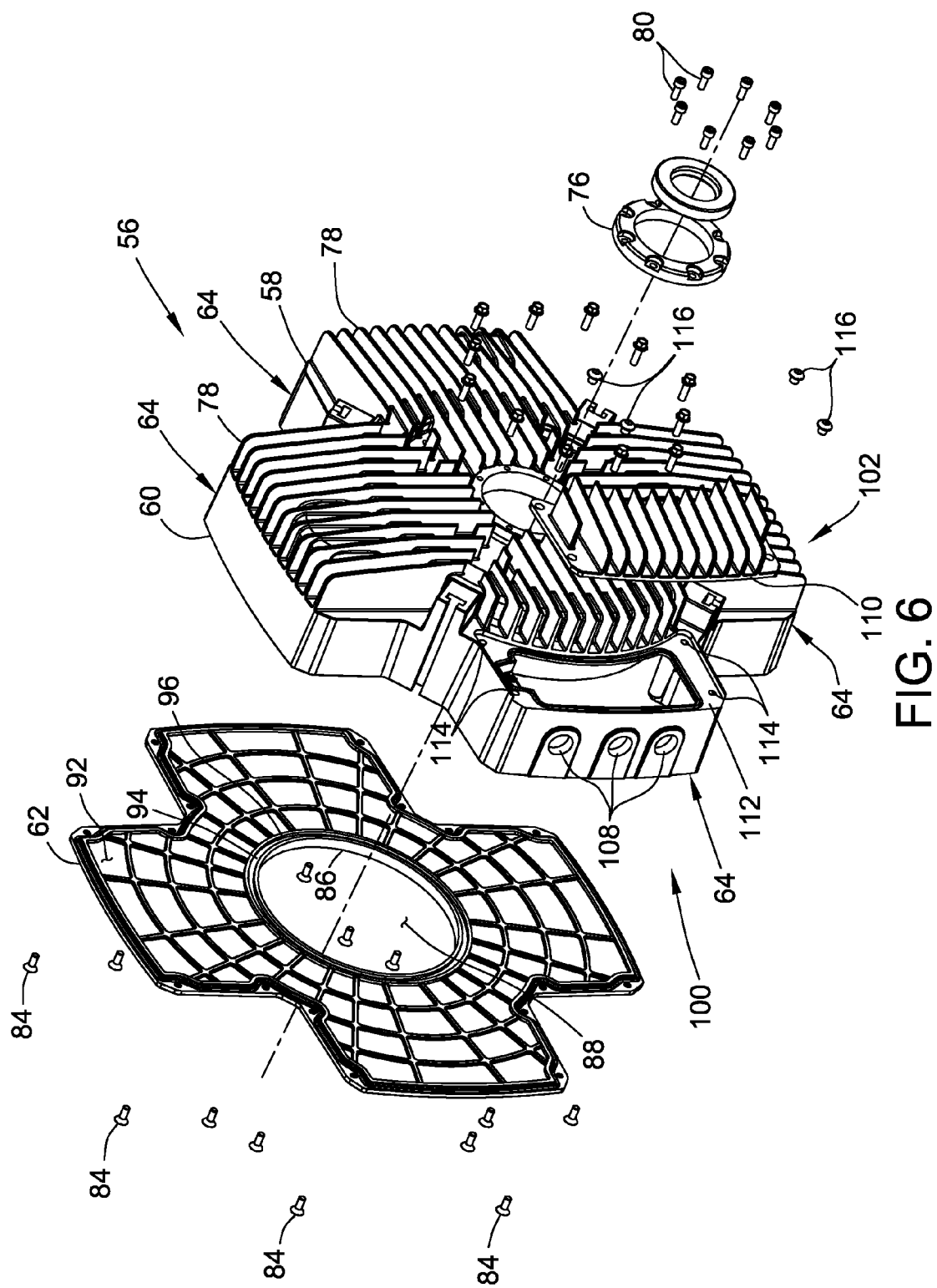
FIG. 6 is an exploded view of the housing of FIG. 5 looking toward a cover plate from the endshield.
Figure 7:
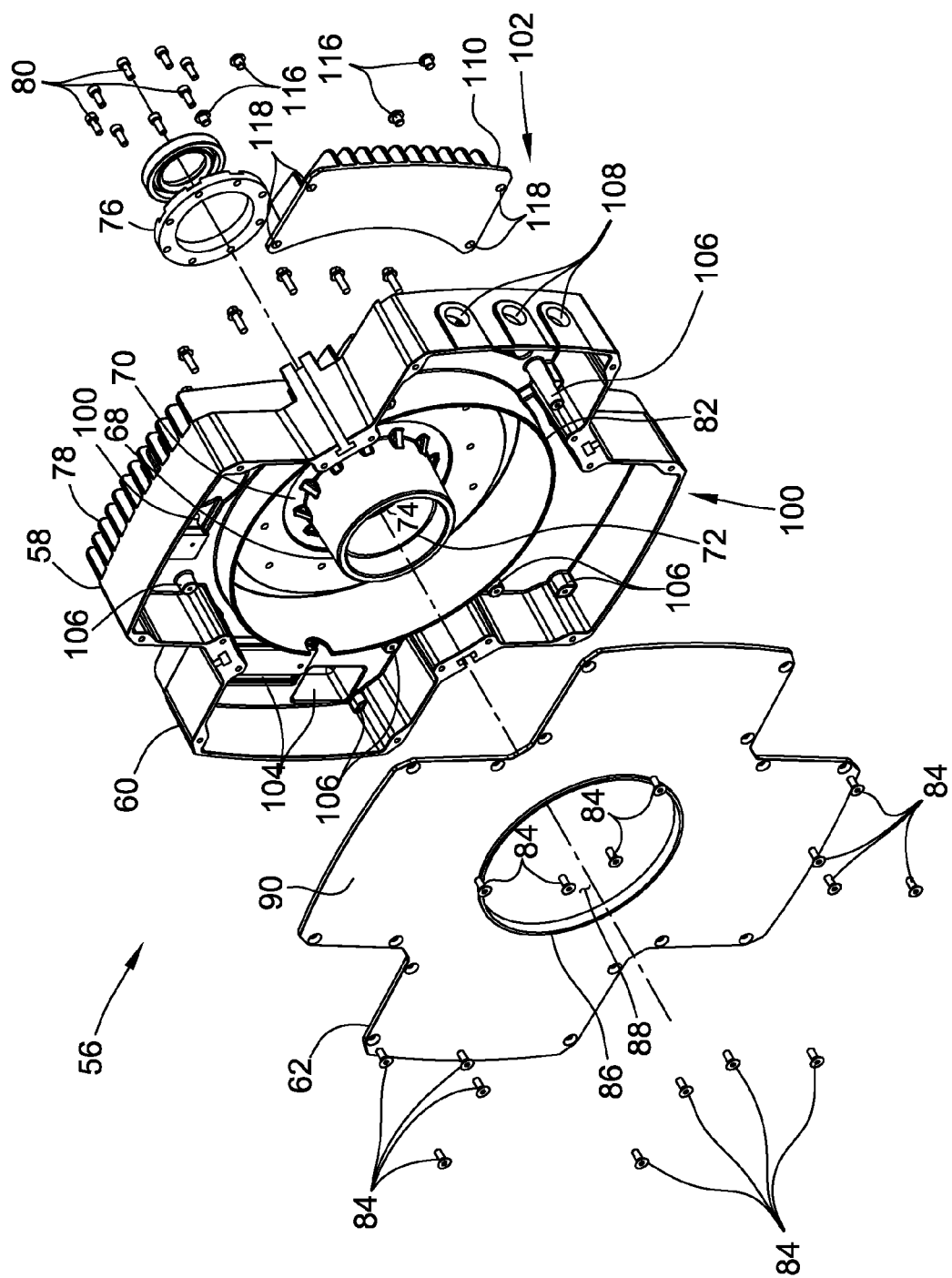
FIG. 7 is an exploded view of the housing of FIG. 5 looking toward the endshield from the cover plate.

Housing 56 is shown in more detail in FIGS. 5-7. Endshield 58 is configured with two distinct sides; a component engaging side 100 as best shown in FIG. 7 and a component cooling side 102 as best shown in FIGS. 5 and 6. Specifically, FIG. 5 is an end view of housing 56 looking axially along center axis 24 toward endshield 58, FIG. 6 is an exploded view of housing 56 looking toward cover plate 62 from endshield 58, and FIG. 7 is an exploded view of housing 56 looking toward endshield 58 from cover plate 62.

In the exemplary embodiment, endshield 58 is cloverleaf-shaped, having four extension portions 64 extending radially outward from an annular center section 66. Alternatively, endshield 58 has fewer or more than four extension portion 64 and can have any shape that enables endshield 58 to function as described herein. Each extension portion 64 is configured to retain a component of controller assembly 46 therein. Center section 66 includes a bearing locator 68 extending from an inner surface 70 of endshield 58 that facilitates retaining bearing assemblies 34a, 34b (shown in FIG. 4) in place. Bearing locator 68 includes opening 35 that is formed as a stepped bore having a first step 72 and a second step 74 defining increasingly smaller bore diameters. Bearing assembly 34a is seated in opening 35 in the smaller diameter portion defined by second step 74. A bearing retainer plate 76 is secured to endshield 58 to secure bearing 34a in place. Retainer plate 76 is attached to endshield 58 using a plurality of mechanical fasteners 80. Bearing assembly 34b is seated in opening 35 in the largest diameter portion defined by first step 72. Bearing locator 68 engages and locates each bearing assembly 34a, 34b by engaging an outer race portion (not shown) to position and secure bearing assemblies 34a, 34b such that bearing assemblies 34a, 34b are positioned radially inward from and concentric with stator assembly 30 (shown in FIG. 4).

In the exemplary embodiment, endshield 58 includes a plurality of cooling fins 78 (best shown in FIG. 6) extending from component cooling side 102. Fins 78 facilitate cooling electrical machine 14 and extend generally radially outward from annular center section 66. Furthermore, fins 78 extend axially outward from endshield 58. In the exemplary embodiment, fins 78 are formed in substantially parallel groups that extend generally radially outward along each extension portions 64, where each group of fins 78 is formed substantially transverse to each respective adjacent group of fins 78. Alternatively, fins 78 can arrangement in any arrangement that enables electrical machine 14 to function as described herein.

In the exemplary embodiment, a flange 82 extends axially inward from surface 70 a distance substantially equal to a length of each stator tooth 38. Flange 82 facilitates substantially isolating stator assembly 30 from controller assembly 46 within endshield 58. This facilitates reducing electrical interference or short circuiting between the assemblies. In one embodiment, endshield 58 is fabricated from cast aluminum. Alternatively, endshield 58 is fabricated from any material that enables endshield 58 to function as described herein, for example, without limitation, an aluminum-tin-nickel alloy, or steel. Further, in the exemplary embodiment, endshield 58 is a single piece cast component. Alternatively, endshield 58 is fabricated as several separate components that can be coupled together to form endshield 58.

In the exemplary embodiment, each of extension portions 64 includes pockets 104 of various shapes and sizes. Pockets 104 are formed in inner surface 70 and extend axially outward toward fins 78. Each one of pockets 104 is configured to conform to a specific shape of a component of controller assembly 46 to enable controller assembly 46 to be enclosed within housing 56. Furthermore, each of extension portions 64 include a plurality of mounting bosses 106 configured to accept a mechanical fastener to hold a circuit board (not shown in FIGS. 5-7) of controller assembly 46.

In the exemplary embodiment, at least one of extension portions 64 includes one or more power inlet openings 108. Inlet openings 108 are circular in shape and extend through flange 60 of endshield 58. In the exemplary embodiment, one of extension portions 64 includes three inlet openings 108 extending through the outer most extent of extension portion 64. Inlet openings 108 are configured to accept an end user's electrical power supply lines for attaching to controller assembly 46. In alterative embodiments, inlet openings 108 and be any shape and any number that enables endshield 58 to function as described herein. In the exemplary embodiment, the extension portion 64 that includes inlet openings 108 is also configured with a terminal cover 110. Terminal cover 110 is fabricated to be a removable portion of endshield 58 to facilitate access to controller assembly 46 for attaching an end user's electrical power supply lines to controller assembly 46 without the need to completely disassemble electrical machine 14. In the exemplary embodiment, terminal cover 110 extends about a perimeter of the respective extension portion 64 and is offset radially outward a distance from center section 66 of endshield 58. Extension portion 64 includes a lip 112 having a plurality of mounting holes 114 for receiving mechanical fasteners 116. Terminal cover 110 includes a plurality of holes 118 that correspond to mounting holes 114 for receiving mechanical fasteners 116. In alternative embodiments, terminal cover 110 can have any size and shape that enables endshield 58 to function as described herein.

In the exemplary embodiment, housing 56 also includes cover plate 62, which is shaped to conform to the perimeter shape of endshield 58. In the exemplary embodiment, cover plate 62 is coupled to endshield 58 using a plurality of mechanical fasteners 84. Cover plate 62 includes an annular inner flange 86 that defines an opening 88 in cover plate 62. Inner flange 86 extends axially away from both an outer surface 90 and an inner surface 92 of cover plate 62. Inner flange 86 is configured facilitate reducing flexing of cover plate 62 and to provide and inner most structure for a sealing channel 94. Sealing channel 94 is formed on inner surface 92 and is defined by inner flange 86 and an outer flange 96 that has a larger diameter and is radially offset from inner flange 86. Channel 94 is shaped and configured to correspond to flange 53 of rotor disk assembly 48.

Figure 8:
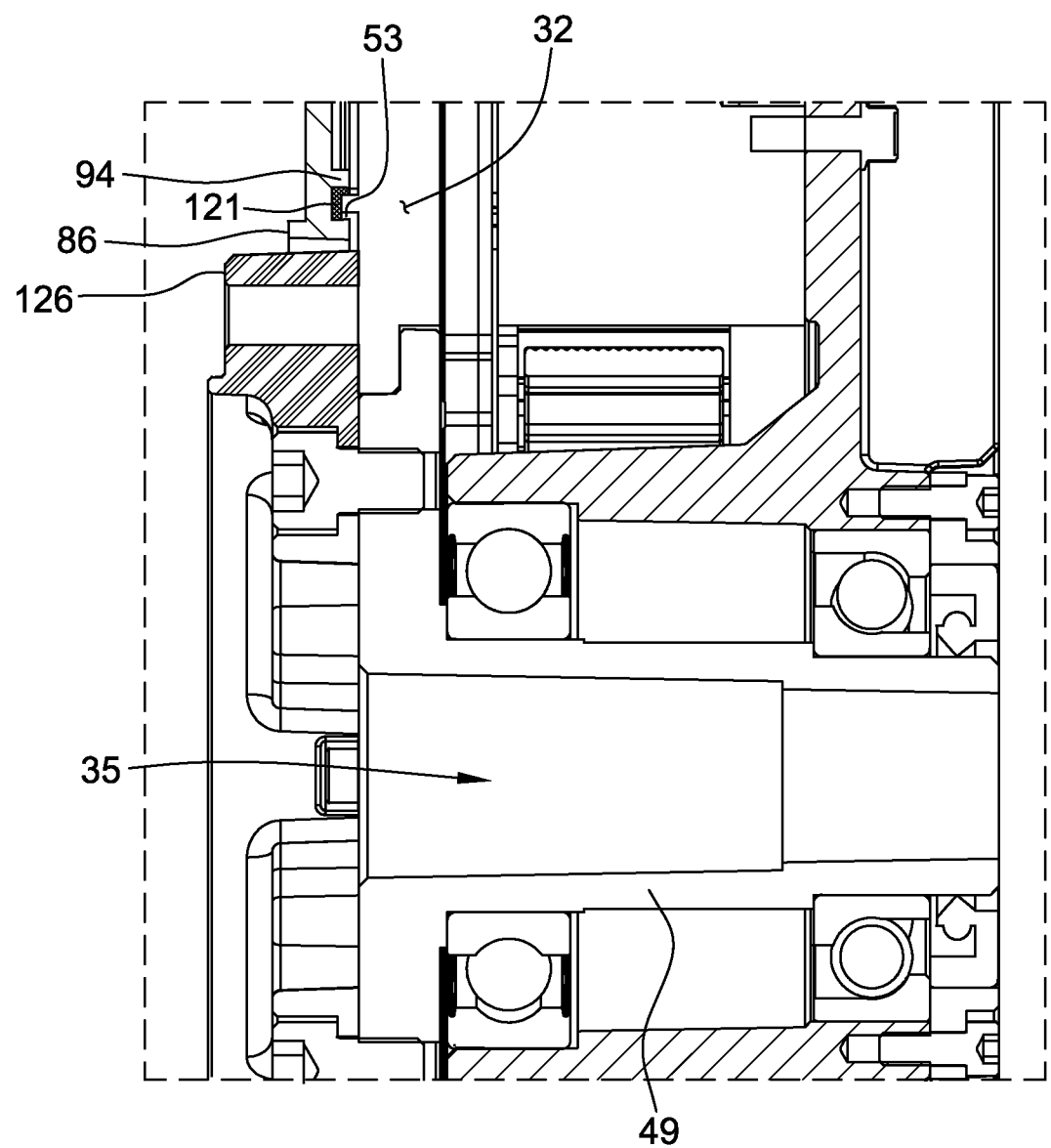
FIG. 8 is an enlarged view of a portion of FIG. 3 identified by box 8.

FIG. 8 is an enlarged view of a portion of FIG. 3 identified by box 8. In the exemplary embodiment, sealing channel 94 and flange 53 cooperate to form a tortuous sealing path between rotor disk assembly 48 and housing 56. In the exemplary embodiment, channel 94 includes a plurality of fiber filaments 121. Each filament 121 is a fine, hair-like structure fabricated from an electrically conductive material. For example, without limitation, filaments 121 can be fabricated from carbon fiber, stainless steel fiber, conductive acrylic fiber, or any other conductive fiber-type filament that enables filaments 121 to function as described herein. In the exemplary embodiment, filaments 121 are adhered directly or indirectly to a carrier structure (not shown) and positioned within sealing channel 94. In operation, the filaments 121 are in electrically conductive contact with rotor disk assembly flange 53 to facilitate grounding rotor disk assembly 48 to reduce electric charges that accumulate on rotor disk assembly 48.

With reference to FIGS. 3 and 4, in the exemplary embodiment, stator assembly 30 is coupled to housing 56 via a plurality of fasteners 120 extending through an axially outermost surface 122 of endshield 58. Furthermore, each one of bearings 34a, 34b is coupled to bearing locator 68 of endshield 58 and bearing retainer plate 76 is secured to endshield 58 to secure bearing 34a in place. Rotor assembly 32 is positioned within housing 56 such that shaft portion 49 extends through bearing assemblies 34a, 34b. In particular, rotor disk assembly 48 seats against bearing assembly 34b to facilitate holding bearing assembly 34b in place against step 72, and step 51 of shaft portion 49 seats against bearing assembly 34a to facilitate holding bearing assembly 34a in place against bearing retainer plate 76. A shaft seal 124 is pressed into a center opening of bearing retainer plate 76 to facilitate keeping debris from entering electrical machine 14, and in particular bearing assemblies 34a, 34b. The location of bearings 34a, 34b in endshield 58 is configured to control the width of air gap 39, which facilitates improving performance and minimizing noise. Cover plate 62 is coupled to endshield 58 to complete assembly of housing 56 and to enclose electrical machine 14.

Figure 9:
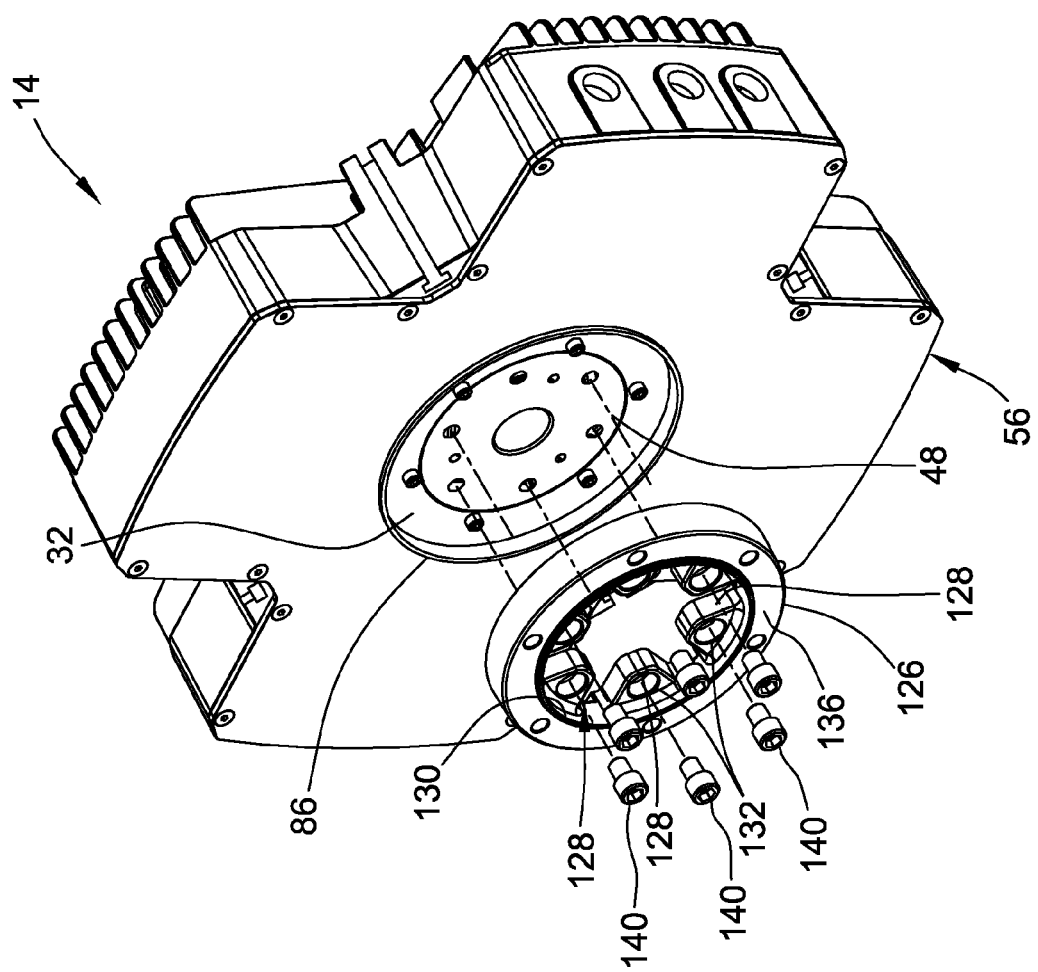
FIG. 9 is an exploded view of a hub drive for use with the electrical machine shown in FIG. 3.
Figure 10:
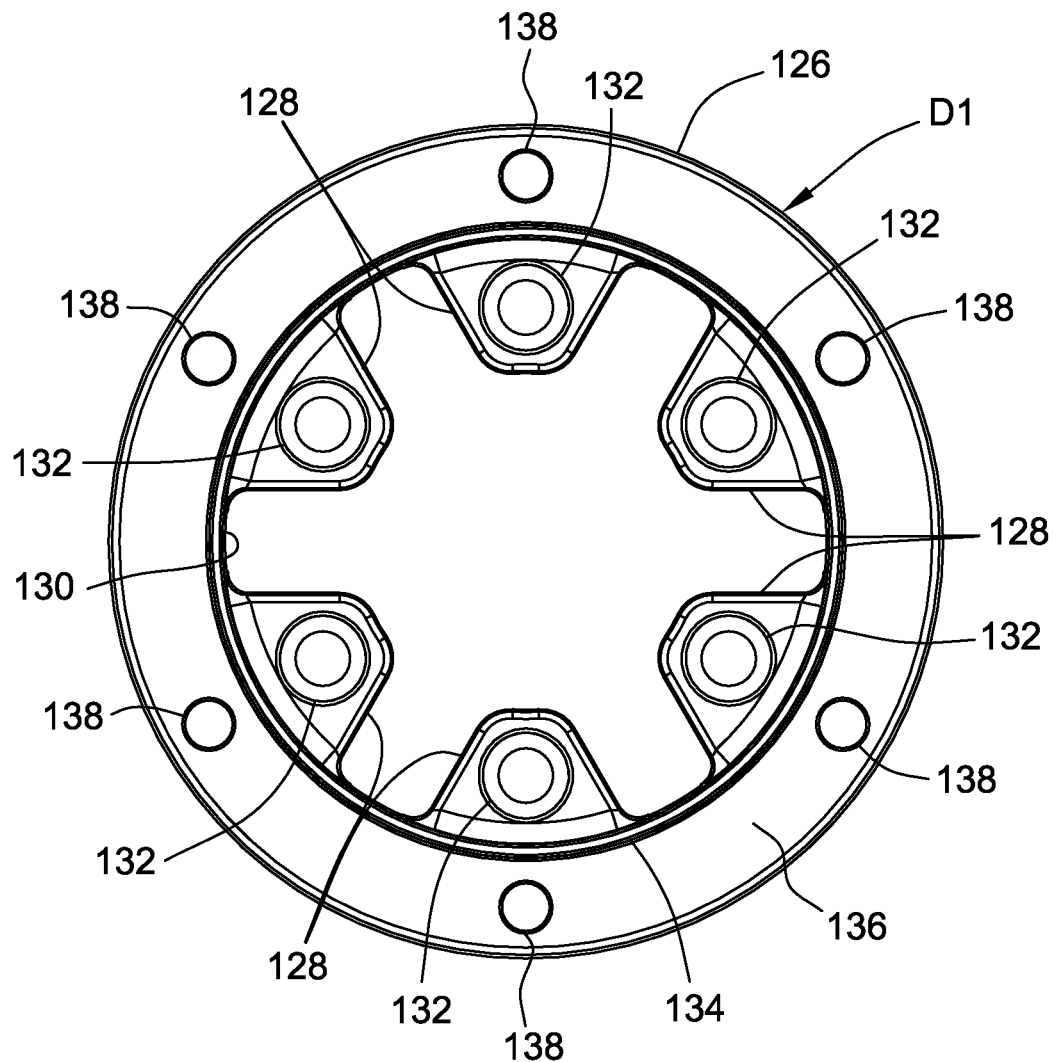
FIG. 10 is a front view of the hub drive shown in FIG. 9.
Figure 11:
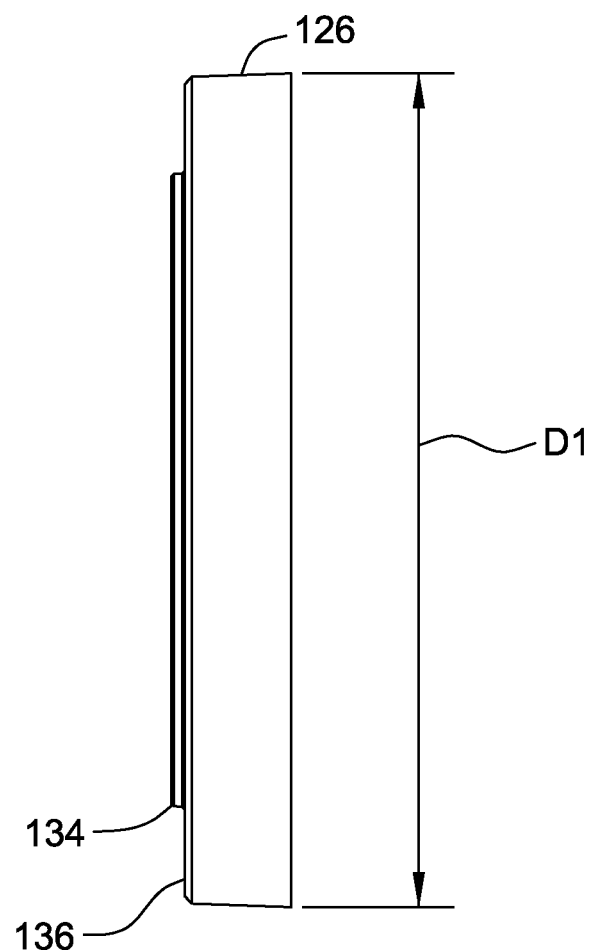
FIG. 11 is a side view of the hub drive shown in FIG. 9.

FIG. 9 is an exploded view of a hub drive 126 for use with electrical machine 14. FIG. 10 is a front view of hub drive 126 and FIG. 11 is a side view of hub drive 126. In the exemplary embodiment, hub drive 126 is ring-shaped and has an outer diameter D1 that is smaller than an inner diameter of flange 86 of cover plate 62. Hub drive 126 includes a plurality of fingers 128 extending radially inward from an inner surface 130 of hub drive 126. Each finger 128 is generally triangular in shape and includes a mounting hole 132 configured to correspond to a respective mounting hole in rotor disk assembly 48. In the exemplary embodiment, hub drive 126 includes an axially extending lip 134 that extends away from rotor disk assembly 48. Lip 134 has a diameter that corresponds to an opening in fan impeller 12, where lip 134 is configured to locate fan impeller 12 substantially concentric with electrical machine 14 to facilitate reducing imbalances and vibrations. In the exemplary embodiment, hub drive 126 includes a substantially flat and smooth face 136 configured to mate directly to rear plate 18 of fan impeller 12. Alternatively, face 136 has grooves, channels, or other features form therein and configured to facilitate moving air through opening 35 in rotor shaft portion 49.

In the exemplary embodiment, hub drive 126 includes a plurality of axially extending mounting holes 138 formed in face 136. Holes 138 are configured to corresponding to respective mounting holes formed in rear plate 18 of fan impeller 12 and to receive fasteners. In the exemplary embodiment, when mounted to rotor disk assembly 48, as best shown in FIG. 3, hub drive 126 has a thickness such that face 136 is positioned axially outward from an extent of flange 86 of cover plate 62 to enable fan impeller (not shown in FIG. 3) to rotate about center axis 24 without interfering with any portion of housing 56. In an alternative embodiment, rotor disk assembly 48 is fabricated with the features of hub drive 126, such that rotor disk assembly 48 can be coupled directly to rear plate 18 of fan impeller 12 without the need to use hub drive 126 therebetween.

Figure 12:
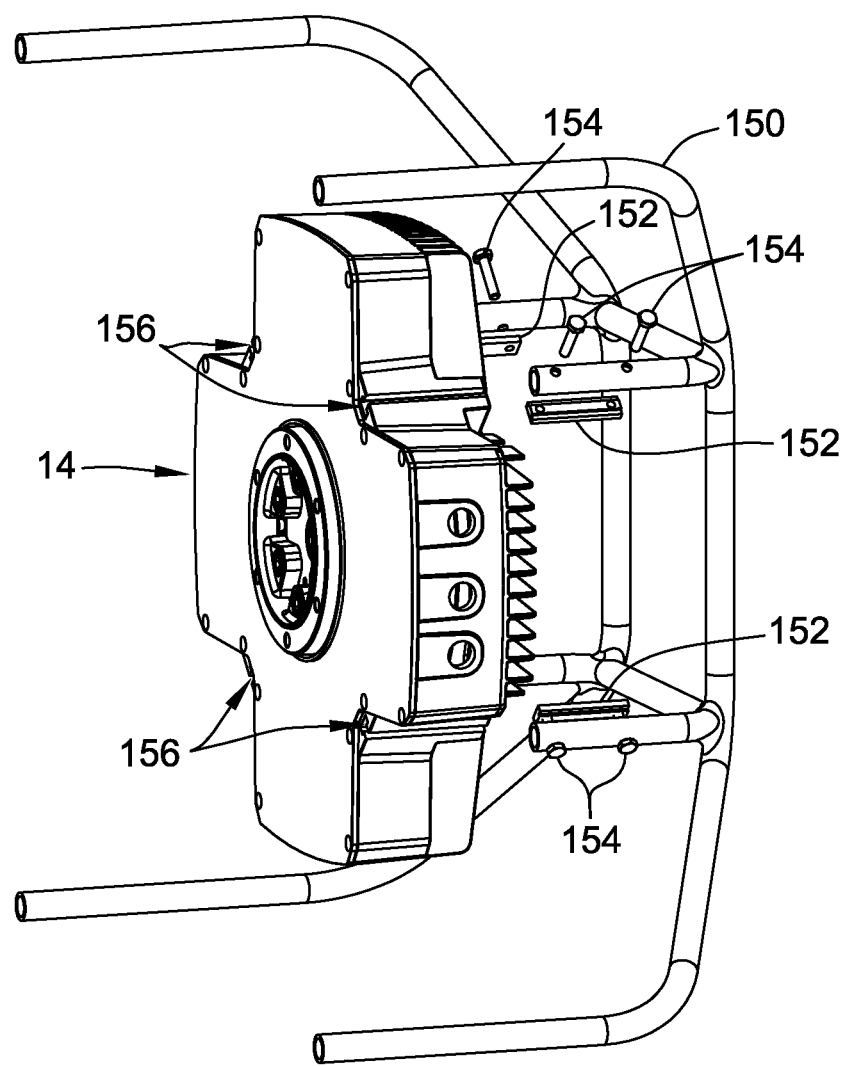
FIG. 12 is an exploded view of a mounting system for the electrical machine shown in FIG. 3.

FIG. 12 is an exploded view of a mounting system for electrical machine 14. In the exemplary embodiment, a support bracket 150 is coupled to electrical machine 14 via a plurality of T-nuts 152 and fasteners 154 that mount to corresponding T-slots 156 formed in housing 56. With reference back to FIGS. 5 and 6, endshield 58 of housing 56 includes a plurality of axially extending T-slots 156. In the exemplary embodiment, endshield 58 includes four T-slots 156, each located in a respective intersection between two adjacent extension portions 64. Each T-slot 156 is identical in size and shape, having a T-shaped cross-section with the narrow opening of each T-slot 156 facing radially outward from center section 66 of endshield 58. As described above, each T-slot 156 extends axially such that each T-slot 156 is substantially parallel to center axis 24. Such a configuration enables electrical machine 14 to be located in an infinite number of locations between the two extents of T-slots 156. Each T-nut 152 is located within a respective T-slot 156 and connected to a respective support arm of support bracket 150 by a pair of fasteners 154. When fasteners 154 are loosely affixed to T-nuts 152, electrical machine 14 can slide along the entire length of T-slots 156. Fasteners 154 are turned to tighten with T-nuts 152 to affix electrical machine 14 in any one of an infinite number of positions within the T-slots 156.

Figure 13:
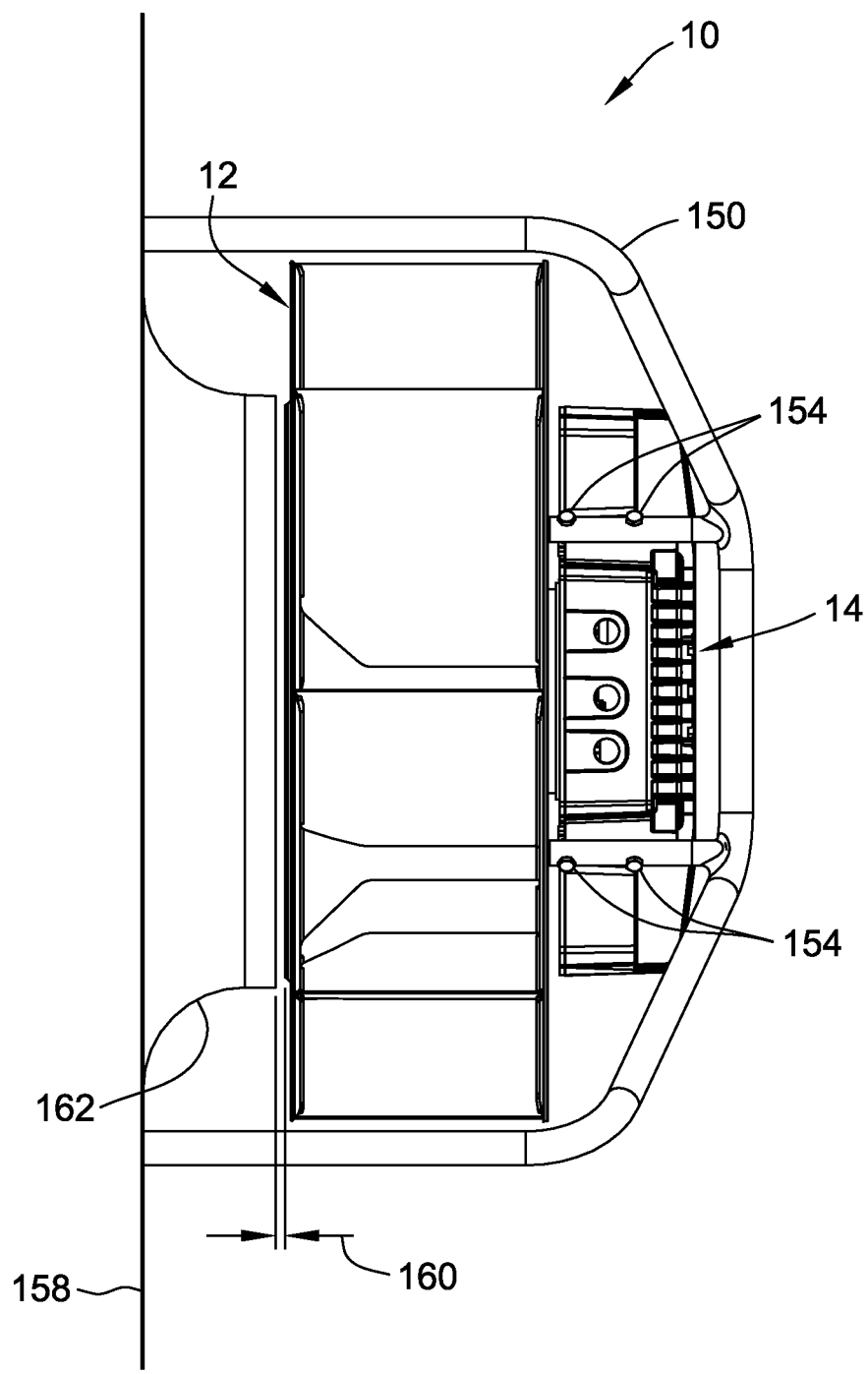
FIG. 13 is a side view of the fluid circulating assembly shown in FIG. 1 coupled to a support bracket and positioned at an outward extent away from an inlet nozzle support plate.
Figure 14:
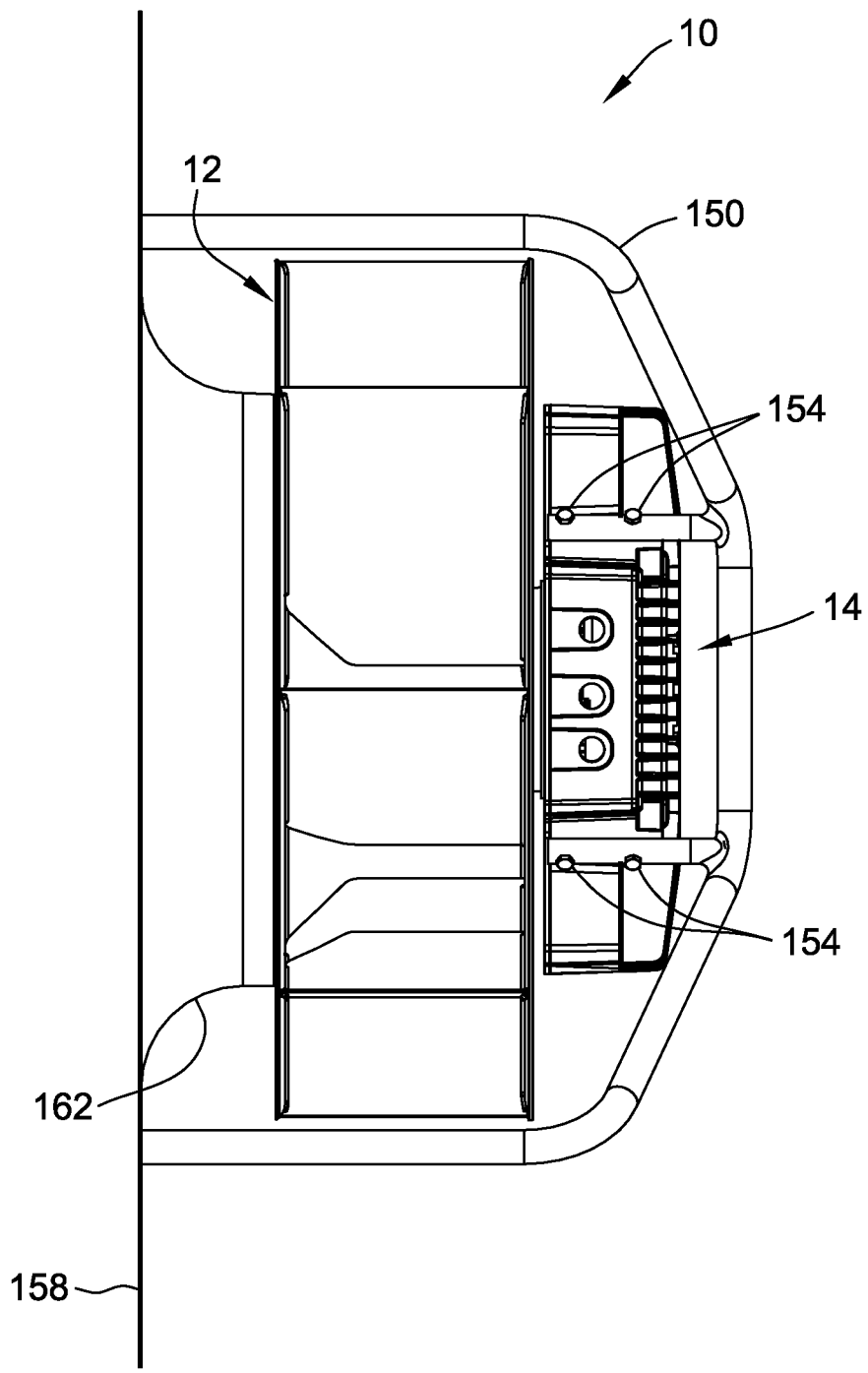
FIG. 14 is a side view of the fluid circulating assembly shown in FIG. 1 coupled to the support bracket and positioned at an inward extent toward the inlet nozzle support plate.

FIG. 13 is a side view of fluid circulating assembly 10 coupled to support bracket 150 and positioned at an outward extent away from an inlet nozzle support plate 158. FIG. 14 is a side view of fluid circulating assembly 10 coupled to support bracket 150 and positioned at an inward extent toward inlet nozzle support plate 158. In the exemplary embodiment, T-nuts 152 and fasteners 154 enable fluid circulating assembly 10 to be accurately positioned with respect to inlet nozzle support plate 158, to enable a user to position fluid circulating assembly 10 at an optimum location based on use conditions. Support bracket 150 is coupled to inlet nozzle support plate 158 via its mounting arms. As shown in FIG. 13, fluid circulating assembly 10 is positioned at its outward extent of T-slots 156, such that support bracket 150 does not contact fan impeller 12, yet a gap distance 160 is defined between central air inlet 22 of impeller 12 and inlet nozzle 162 of inlet nozzle support plate 158. Moreover, as shown in FIG. 14, fluid circulating assembly 10 is positioned at its inward extent of T-slots 156, such that central air inlet 22 of impeller 12 is positioned beyond inlet nozzle 162 of inlet nozzle support plate 158, and no gap distance 160 is defined. The use of T-nuts 152 enables fluid circulating assembly 10 to be positioned in any one of an infinite number of positions between the inward and outward extents of T-slots 156.

Figure 15:
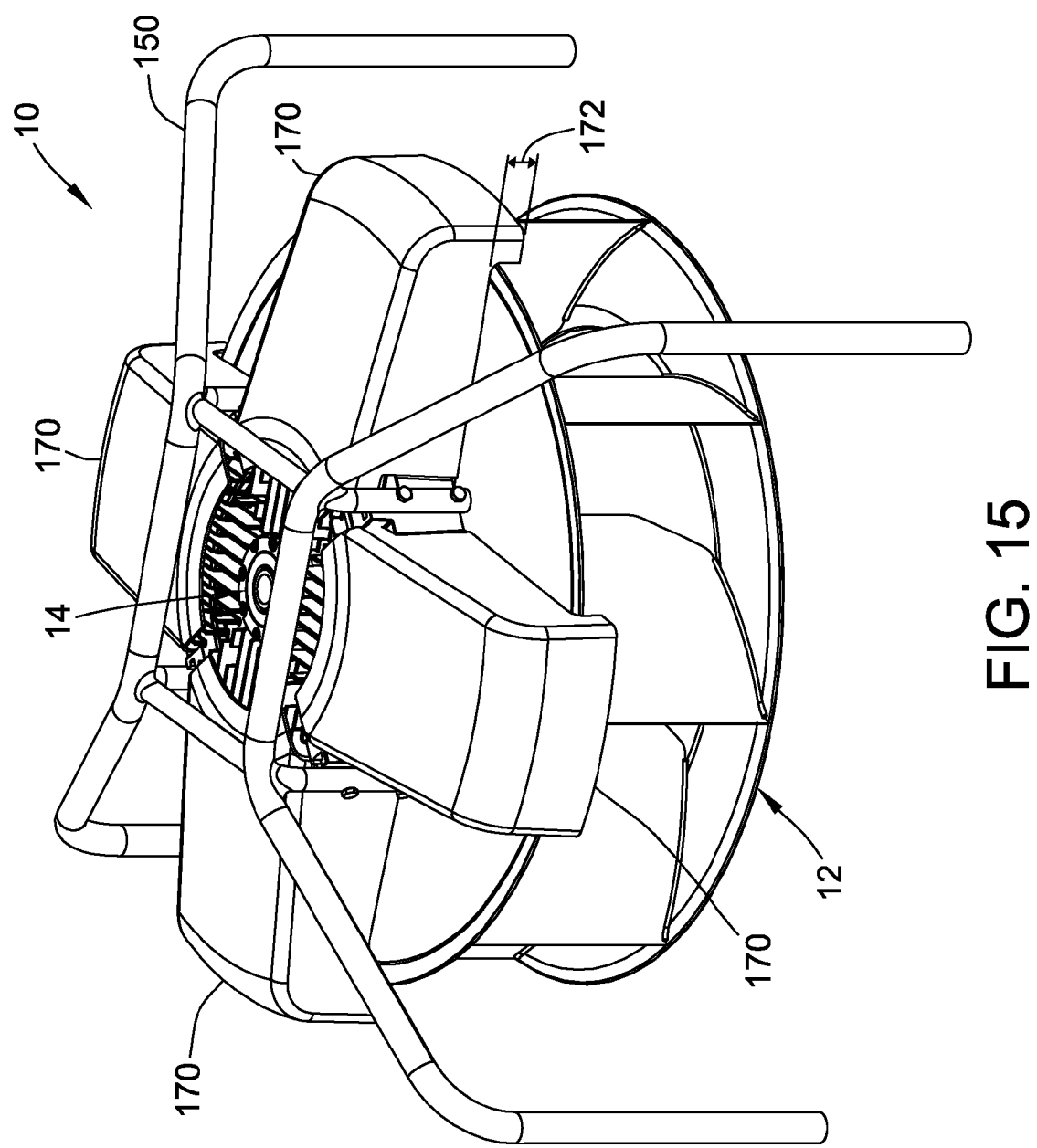
FIG. 15 is a schematic perspective of the fluid circulating assembly shown in FIG. 1 mounted to the support bracket and including cooling ducts.

FIG. 15 is a schematic perspective of fluid circulating assembly 10 mounted to support bracket 150 and including cooling ducts 170. In the exemplary embodiment, electrical machine 14 includes a plurality of cooling ducts 170 configured to be secured to endshield 58 of electrical machine 14 using, for example, without limitation, mechanical fasteners coupled to endshield 58. An advantage provided by ducts 170 is that they are lightweight, easy to install, and can be used to convert air ejected by fan impeller 12 to cool electrical machine 14. Each duct 170 is securely coupled to one of extension portions 64 of housing 56 and extends over fins 78 of the respective extension portion 64. Each duct 170 is substantially U-shaped in cross-section and forms a converging taper extending radially outward between center section 66 of endshield 58 and an outer edge of rear plate 18. At the outer edge of rear plate 18, duct 170 turns approximately 90 degrees and extends a predefined distance 172 past the edge of rear plate 18. This enables duct 170 to capture a portion of air ejected by fan impeller 12 and direct it over fins 78 to facilitate cooling electrical machine 14.

In an alternative embodiment, each duct 170 is substantially U-shaped in cross-section and forms a converging taper that extends radially outward between center section 66 of endshield 58 and an outer edge of rear plate 18, where duct 170 terminates, forming a radially extending U-shaped channel over fins 78 and extension portions 64. In such an embodiment, an axial fan is coupled to rotor shaft portion 49 and positioned proximate fins 78 of center section 66, such that air is forced over fins 78 and through ducts 170. In such an embodiment, axial fan is turned by electrical machine 14.

Ducts 170 are suitably fabricated from any number of materials, including a plastic sheet material or other sheet material. For example, in one suitable embodiment, ducts 170 are formed by a molding, forming, or extruding process used for fabricating parts from thermoplastic or thermosetting plastic materials and/or metals. Alternatively, ducts 170 are fabricated from a combination of materials such as attaching two or more sheet components together to form ducts 170. Ducts 170, however, are constructed of any suitable material, such as metal, that permits ducts 170 to function as described herein.

Figure 16:
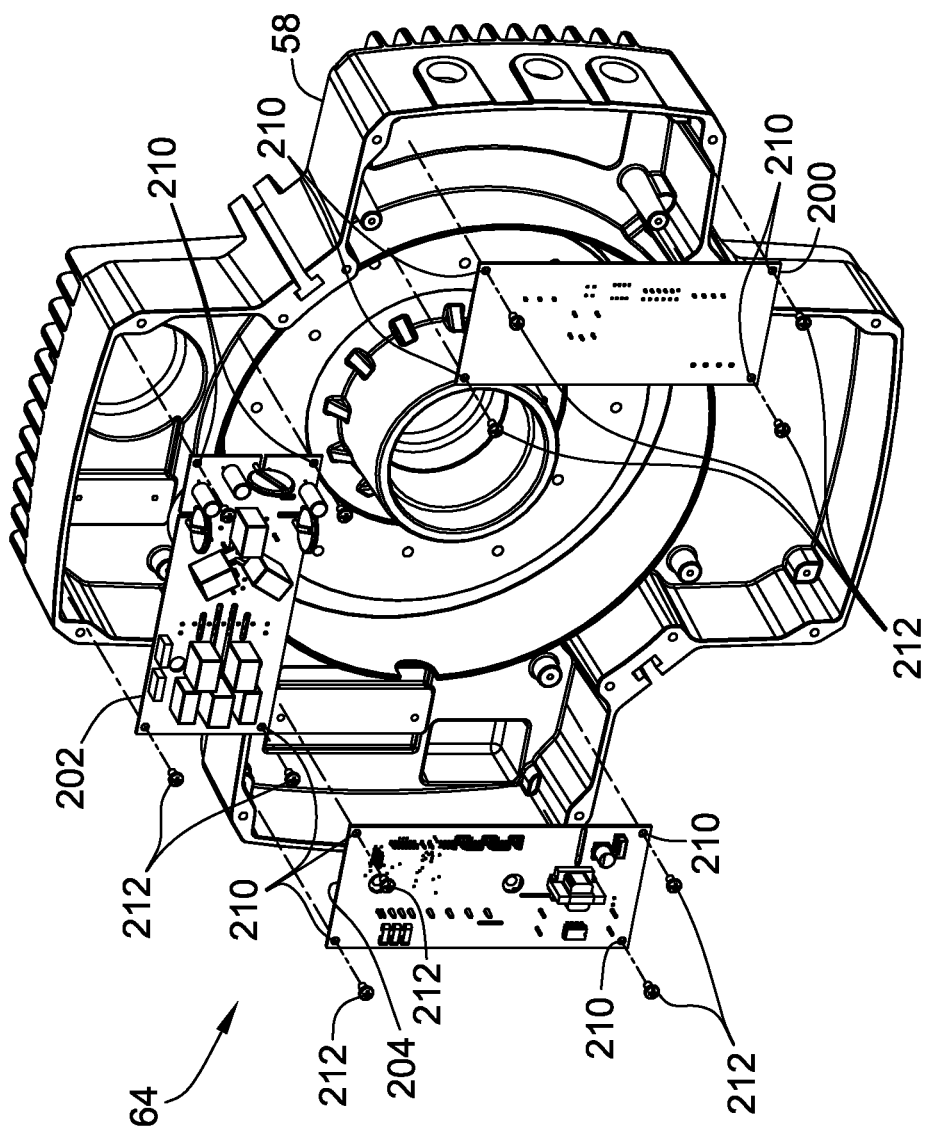
FIG. 16 is an exploded perspective view of the endshield shown in FIG. 5 having a controller assembly attached thererto.
Figure 17:
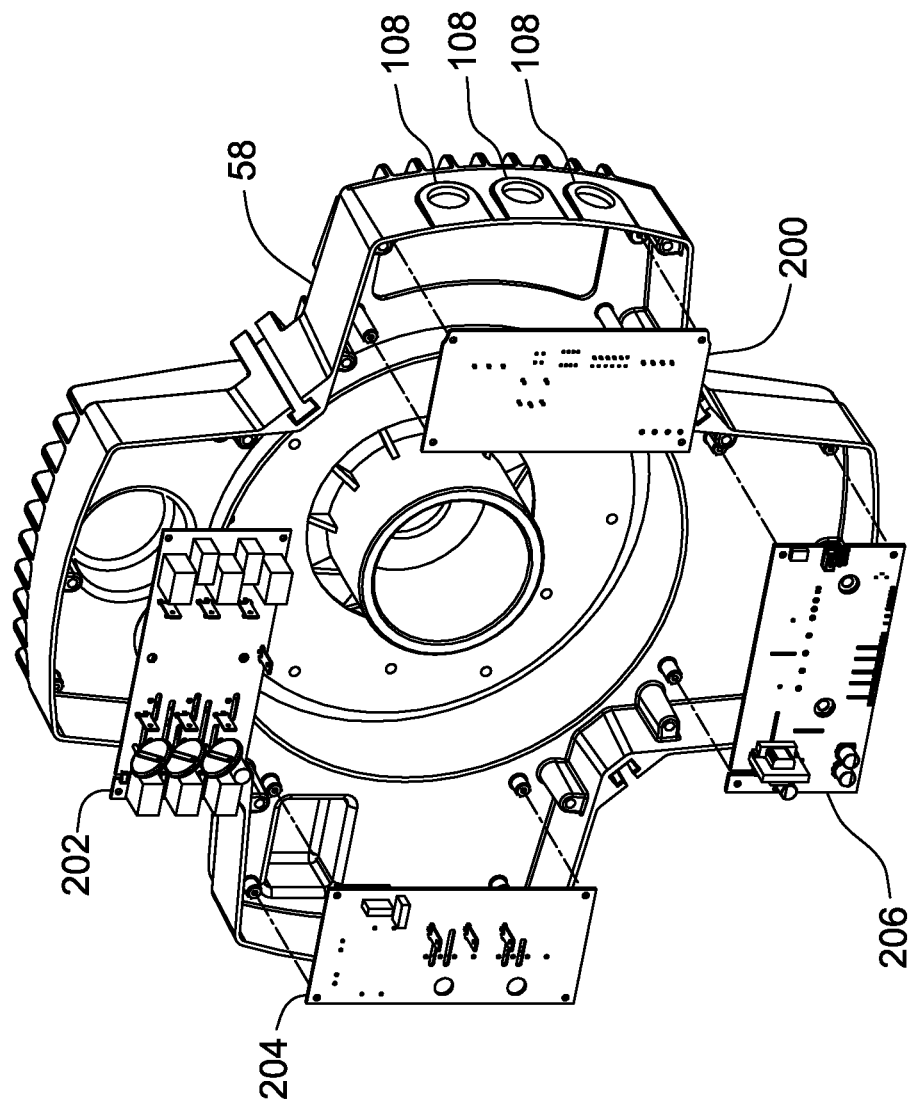
FIG. 17 is an exploded perspective view of the endshield shown in FIG. 5 having an alternative embodiment of the controller assembly attached thererto.

FIG. 16 is an exploded perspective view of endshield 58 having controller assembly 46 attached thereto. As described above, controller assembly 46 is coupled within housing 56 adjacent to stator assembly 30 and rotor assembly 32, such that controller assembly 46 is positioned radially outward from stator assembly 30. Controller assembly 46 includes more than one circuit board. In the exemplary embodiment, controller assembly 46 includes three circuit boards; a user interface board 200, a rectifier board 202, and an inverter board 204. Alternatively, controller assembly 46 includes fewer or more circuit boards. For example, without limitation, in one alternative embodiment shown in FIG. 17, controller assembly 46 includes four circuit boards; one located in each extension portion 64, including user interface board 200, rectifier board 202, inverter board 204, and an AC input board 206. In one suitable embodiment, controller assembly 46 includes two circuit boards such that power can be supplied directly to inverter board 204, thereby eliminating the need for rectifier board 202 and user interface board 200. Moreover, in another suitable embodiment, a single circuit board is used with controller assembly 46, such that all functions of controller assembly 46 is integrated onto the single circuit board.

In the exemplary embodiment, user interface board 200, rectifier board 202, and inverter board 204, i.e., controller assembly 46, are oriented substantially planar with respect to a back plane of stator assembly 30. As such, controller assembly 46 is not oriented axially with respect to electrical machine 14. Alternatively, one or more of boards 200, 202, and 204, can be arranged perpendicular to an axial plane of stator assembly 30, thereby enabling alternative packaging layouts. Advantages of breaking controller assembly 46 into modular board components, includes: enabling controller assembly 46 to be favorably arranged around the outside diameter of stator assembly 30; enabling controller assembly 46 to share a common heat sink, i.e., endshield 58, with stator assembly 30; arranging the boards of controller assembly 46 to separate heat making devices onto separate boards; and separating controller assembly 46 into major functions which can be built on separate boards.

In the exemplary embodiment, each one of boards 200, 202, and 204 is substantially rectangular in shape and is sized to fit a respective extension portion 64 of endshield 58. This facilitates reducing the cost of manufacturing different shape boards, for example, circular-shaped boards, that are used in axially-stacked motors. Alternatively, boards 200, 202, and 204 can be fabricated in any number of shapes that facilitates operation of fluid circulating assembly 10 as described herein. In the exemplary embodiment, boards 200, 202, and 204 are distributed around stator assembly 30 and are separated into separate functions built on a respective one boards 200, 202, and 204. Using separate boards 200, 202, and 204 having distinct functions enables the individual boards of controller assembly 46 to be updated without affecting the entire controller assembly 46. Such updates can be necessitated by end users, new components, cost savings, or obsolescence of current components. Furthermore, by separating controller assembly 46 into discrete circuit boards, the circuit sections can be arranged in different configurations to alter the final shape of electrical machine 14 and controller assembly 46. In addition, separating boards 200, 202, and 204 into separate functions facilitates spreading the heat making components of controller assembly 46 apart to facilitate cooling of controller assembly 46.

In the exemplary embodiment, user interface board 200 is coupled to the extension portion 64 having inlet openings 108 and terminal cover 110. User interface board 200 includes a plurality of mounting holes 210 formed therethrough, including one mounting hole 210 in each corner of board 200. A fastener 212 is passed through each hole 210 and coupled to endshield 58 to secure board 200 in place. The user then attaches his inputs to user interface board 200, for example, without limitation, an AC input connection, a serial communication connection, and any additional discrete input/output digital or analog connections. User interface board 200 outputs the AC current and a serial communication signal and receives a low voltage direct current (DC) signal from inverter board 204 to power board 200.

Rectifier board 202 is coupled to an extension portion 64 adjacent user interface board 200. Rectifier board 202 includes a plurality of mounting holes 210 formed therethrough, including one mounting hole 210 in each corner of board 202. A fastener 212 is passed through each hole 210 and coupled to endshield 58 to secure board 202 in place. Rectifier board 202 receives the AC current from user interface board 200, and outputs a high current DC signal, via any one of a standard connector type (not shown).

Inverter board 204 is coupled to an extension portion 64 adjacent rectifier board 202. Inverter board 204 includes a plurality of mounting holes 210 formed therethrough, including one mounting hole 210 in each corner of board 204. A fastener 212 is passed through each hole 210 and coupled to endshield 58 to secure board 204 in place. Inverter board 204 receives the high current DC signal from rectifier board 202 and the serial communication from user interface board 200, and outputs an AC signal to stator assembly 30 to drive electrical machine 14 and a low voltage DC signal to user interface board 200. The input and output connections on inverter board 204 are any one of a standard connector type (not shown).

In alternative embodiments, if the power requirements for electrical machine 14 are such that any one board generates excessive heat, the modular configuration of controller assembly 46 enables each of the circuit boards to be reconfigured to spread the heat generating components around stator assembly 30. For example, in one suitable embodiment, rectifier board 202 includes a bridge rectifier and a common mode choke, each of which can generate heat. If the heat generated is determined to be excessive, rectifier board 202 can be split into two separate boards, such that the bridge rectifier and the common mode choke are placed on respective discrete boards. Each board can then be placed into a separate extension portion 64 of endshield 58.

As shown in FIG. 2, electrical machine 14 is coupled to fan impeller 12 such that electrical machine 14 is positioned entirely outside fan chamber 28, i.e., no portion of electrical machine 14 extends through rear plate 18 to intrude into chamber 28. Thus, air is able to flow through chamber 28 free of disturbances and without being directed around electrical machine 14, as is the case in at least some known fan assemblies having radial flux motors. Such interference generally results in a loss of fan efficiency. Therefore, zero intrusion of electrical machine 14 into chamber 28 prevents such a loss in efficiency and provides for an increase in efficiency of fluid circulating assembly 10 as compared to at least some known fluid circulating assemblies having radial flux motors that extend a significant distance into the fan chamber.

In the exemplary embodiment, as best shown in FIG. 2, electrical machine 14 does not include a shaft or a shaft hub assembly to couple electrical machine 14 to fan impeller 12. Rather, electrical machine 14 is coupled directly to rear plate 18 of fan impeller 12 via drive hub 126 to facilitate rotation of fan impeller 12 about center axis 24. More specifically, drive hub 126 is coupled directly to rotor disk assembly 48, and rear plate 18 is coupled directly to drive hub 126 via fasteners 164 threaded through corresponding openings (not shown) formed in rear plate 18. Alternatively, rotor disk assembly 48 can be fabricated to couple directly to rear plate 18, such that drive hub 126 is not needed. In another embodiment, rotor disk assembly 48 is coupled to rear plate 18 in any manner that facilitates operation of fluid circulating assembly 10 as described herein.

Figure 18:
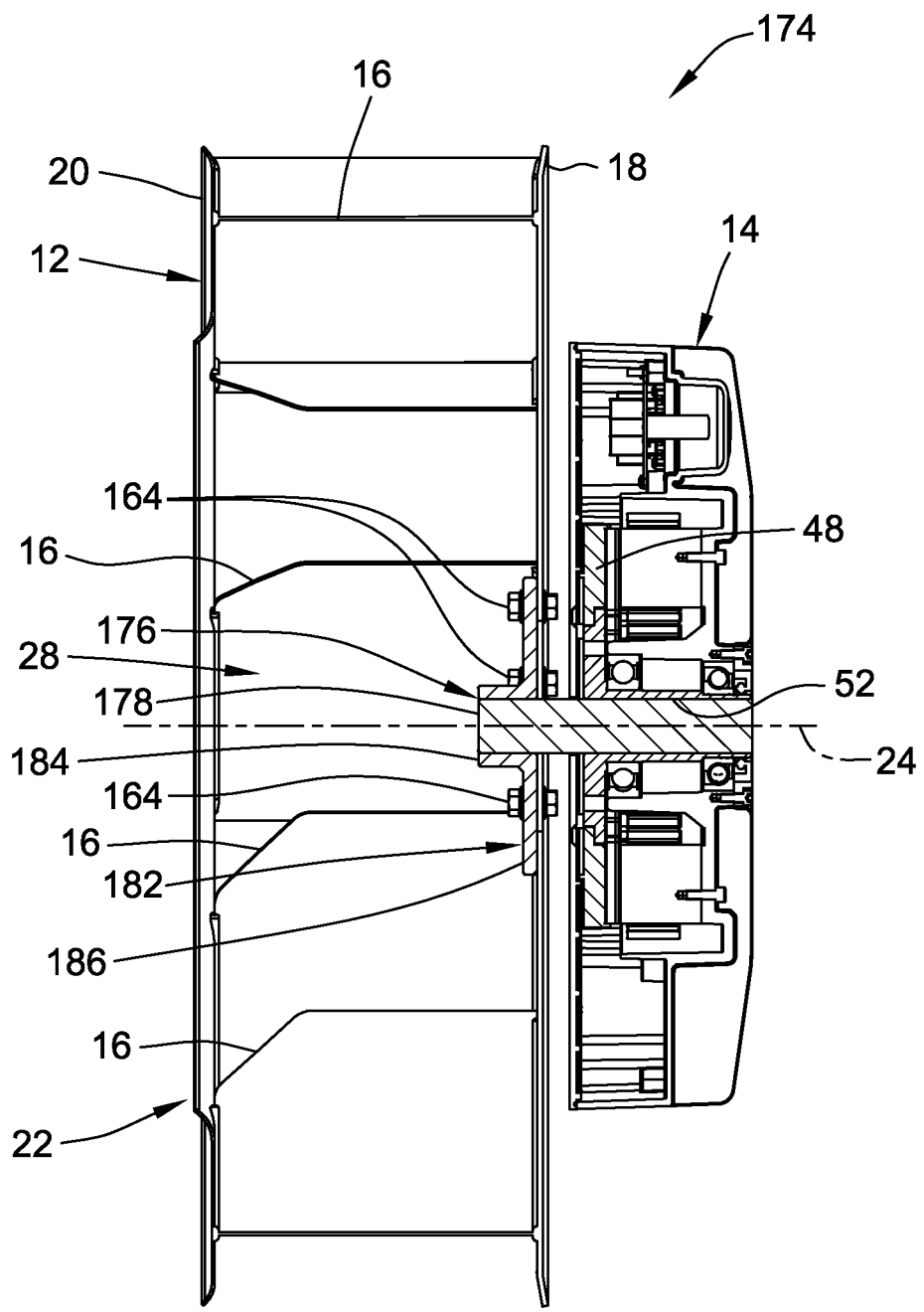
FIG. 18 is a cross-sectional view of an alternative fluid circulating assembly.
Figure 19:
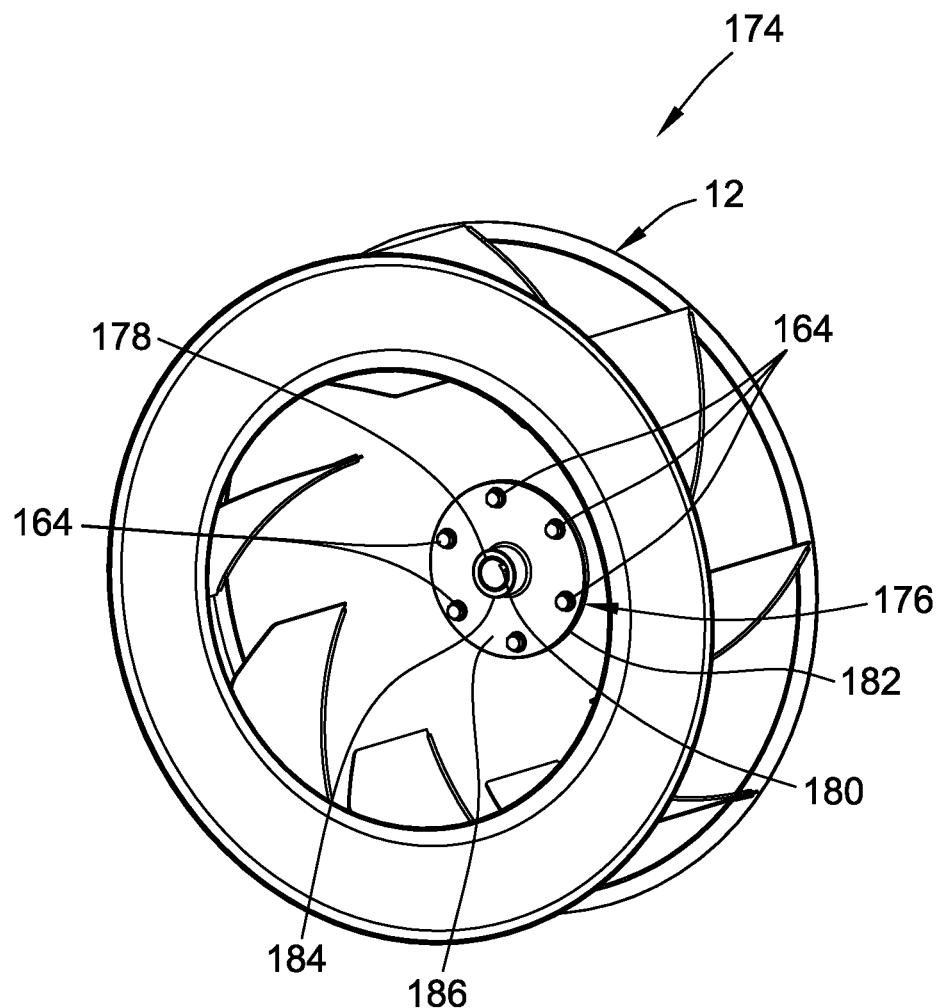
FIG. 19 is a schematic perspective of the alternative fluid circulating assembly shown in FIG. 18, showing a shaft/hub assembly for coupling a fan impeller to the electrical machine shown in FIG. 3.

FIG. 18 is a cross-sectional view of an alternative fluid circulating assembly 174. FIG. 19 is a schematic perspective of the alternative fluid circulating assembly shown in FIG. 18, showing a shaft/hub assembly 176 for coupling fan impeller 12 to electrical machine 14. In this embodiment, electrical machine 14 includes a shaft 178 coupled to radially inner wall 52 of rotor disk assembly 48. In the exemplary embodiment, shaft 178 is sized to provide an interference fit with inner wall 52. A keyway 180 is formed in shaft 178 for keying shaft 178 to radially inner wall 52 of rotor disk assembly 48. In alternative embodiments, shaft 178 is coupled to radially inner wall 52 of rotor disk assembly 48 in any manner that enables fluid circulating assembly 174 to function as described herein. In the embodiment shown in FIGS. 18 and 19, shaft 178 extends axially away from electrical machine 14 into chamber 28 of fan impeller 12. Shaft/hub assembly 176 includes a hub flange 182 coupled to fan impeller 12 via a plurality of fastener 164. Hub flange 182 includes a generally cylindrical hub portion 184 and an annular flange portion 186 extending radially outward from hub portion 184 and located at an end of the hub portion. Hub flange 182 includes a hole (not shown) that is concentric with hub portion 184 and configured to couple to shaft 178. In this embodiment, shaft 178 is keyed to hub flange 182 and forms an interference fit with the hole (not shown) provided through hub flange 182. Hub flange 182 also includes a plurality of fasteners openings (not shown) configured to receive fasteners 164 for coupling to fan impeller 12. In alternative embodiments, shaft 178 is coupled to hub flange 182 in any manner that enables fluid circulating assembly 174 to function as described herein.

In operation, copper windings 44 are coupled to stator core 36 and are energized in a predetermined sequence by controller assembly 46. Cooper winding's 44 facilitates generating an axial magnetic field that moves in one of a clockwise and counterclockwise direction around stator core 36, depending on the predetermined sequence in which copper windings 44 are energized. The moving magnetic field intersects with a flux field generated by permanent magnets 54 to generate a torque that causes rotor assembly 32 to rotate about center axis 24 relative to stator assembly 30. The generated torques is a direct function of the strength, or intensity, of the magnetic field interactions between cooper windings 44 and permanent magnets 54. Because rotor disk assembly 48 is coupled directly to rear plate 18 of fan impeller 12, rotation of rotor disk assembly 48 facilitates rotation of fan impeller 12.

The present disclosure provides a fluid circulating assembly with improved structural designs that improves the air flow entering, passing through, and downstream of the assembly. More specifically, a fluid circulating assembly is disclosed that includes an electrical machine that is coupled directly to the fan such that the electrical machine does not intrude into the inner fan chamber and is positioned entirely outside the fan chamber to facilitate preventing interference with airflow within the fan chamber. More specifically, the electrical machine includes a drive hub that is coupled directly to the rotor assembly of the electrical machine and the rear plate of the fan to facilitate rotation of the fan. The fluid circulating assembly also includes a substantially planar controller assembly coupled radially outward from the stator assembly. The controller assembly enables a low profile housing to cover the electrical machine and the controller assembly such that the housing extends a minimal distance from the fan rear plate and functions as a large single heat sink for both the stator assembly and the controller assembly. As such, the fluid circulating assembly takes up less space within a fluid circulating system and provides for additional space for additional system components. Furthermore, the fluid circulating assembly contains fewer overall components, which provides for a fluid circulating assembly that is less expensive and easier to assemble than other known fluid circulating assemblies.

The apparatus, methods, and systems described herein provide a fluid circulating assembly having increased efficiency, reduced noise, and an improved airflow distribution through the fan. One advantage to breaking the controller assembly of the centrifugal fan into modular board components includes enabling the controller assembly to be favorably arranged around the outside diameter of stator assembly. Another advantage is that the controller assembly and the stator assembly can share a common heat sink. Yet another advantage is that the controller assembly can be arranged such that the modular boards of the controller assembly can be separated by one or more of a particular board function and a combination of heat making components. The exemplary embodiments described herein provide apparatus, systems, and methods particularly well-suited for HVAC centrifugal blowers.

Further, the embodiments described herein relate to fan assemblies that include a backward curved fan and an axial flux electrical machine that reduces or prevents airflow interference within the fan and improves the efficiency of the fluid circulating assembly. More particularly, one embodiment includes a motor coupled to the fan such that the motor does not intrude into the fan chamber. The methods and apparatus are not limited to the specific embodiments described herein, but rather, components of apparatus and/or steps of the methods may be utilized independently and separately from other components and/or steps described herein. For example, the methods may also be used in combination with a forward curved fan or blower assembly, and are not limited to practice with only the backward curved fan as described herein. In addition, the embodiment can be implemented and utilized in connection with many other HVAC applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A fluid circulating assembly comprising:
   an electrical machine comprising a rotor assembly, a stator assembly, and a housing, said housing comprising an annular center section and at least two extension portions extending radially outward from said annular center section, wherein said annular section and said at least two extension portions form at least a portion of a cavity within said housing; and
   a controller assembly coupled to said housing, wherein said controller assembly is positioned radially outward from said stator assembly and located in at least one of said at least two extension portions within the cavity.

2. The fluid circulating assembly in accordance with claim 1, wherein said controller assembly comprises a modular controller assembly comprising at least two circuit boards, each respective circuit board positioned in a respective one of said at least two extension portions.

3. The fluid circulating assembly in accordance with claim 2, wherein said at least two circuit boards are arranged by discrete functions of said controller assembly.

4. The fluid circulating assembly in accordance with claim 3, wherein said modular controller assembly comprises three circuit boards, comprising a user interface board, a rectifier board, and an inverter board.

5. The fluid circulating assembly in accordance with claim 3, wherein said modular controller assembly comprises four circuit boards, comprising a user interface board, an AC input board, and a rectifier board, and an inverter board.

6. The fluid circulating assembly in accordance with claim 2, wherein said at least two circuit boards are fabricated by distributing at least one heat making component of said controller assembly onto each of said at least two circuit boards.

7. The fluid circulating assembly in accordance with claim 2, wherein at least one of said at least two circuit boards are arranged perpendicular to an axial plane of said stator assembly.

8. The fluid circulating assembly in accordance with claim 2, wherein at least one of said at least two circuit boards are arranged substantially planar with respect to a back plane of said stator assembly.

9. The fluid circulating assembly in accordance with claim 1, wherein said controller assembly is oriented substantially planar with respect to a back plane of said stator assembly.

10. The fluid circulating assembly in accordance with claim 1, wherein said housing comprises an annular flange extending axially inward from an inner surface of said housing, said annular flange extending from a periphery of said annular center section to facilitate isolating said stator assembly from said controller assembly.

11. The fluid circulating assembly in accordance with claim 1, wherein at least one of said at least two extension portions comprises one or more of the following: an inlet opening and a terminal cover.

12. A method of assembling a fluid circulating assembly, said method comprising:
    providing an electrical machine including a rotor assembly, a stator assembly, and a housing, the housing including an annular center section and at least two extension portions extending radially outward from the annular center section, wherein the annular section and the at least two extension portions form at least a portion of a cavity within the housing; and
    positioning a controller assembly within to the cavity, wherein the controller assembly is positioned radially outward from the stator assembly and located in at least one of the at least two extension portions.

13. The method in accordance with claim 12, wherein coupling a controller assembly to the housing comprises coupling the controller assembly to the housing, wherein the controller assembly includes a modular controller assembly having at least two circuit boards, each respective circuit board positioned in a respective one of the at least two extension portions.

14. The method in accordance with claim 13, wherein coupling a controller assembly to the housing comprises coupling the controller assembly to the housing, wherein the at least two circuit boards are arranged by discrete functions of the controller assembly.

15. The method in accordance with claim 13, wherein coupling a controller assembly to the housing comprises coupling the controller assembly to the housing, wherein the at least two circuit boards are fabricated by distributing at least one heat making component of the controller assembly onto each of the at least two circuit boards.

16. The method in accordance with claim 13, wherein coupling a controller assembly to the housing comprises coupling the controller assembly to the housing, wherein at least one of the at least two circuit boards are arranged perpendicular to an axial plane of the stator assembly.

17. The method in accordance with claim 13, wherein coupling a controller assembly to the housing comprises coupling the controller assembly to the housing, wherein at least one of the at least two circuit boards are arranged substantially planar with respect to a back plane of the stator assembly.

18. The method in accordance with claim 12, wherein coupling a controller assembly to the housing comprises coupling the controller assembly to the housing, wherein the controller assembly is oriented substantially planar with respect to a back plane of the stator assembly.

19. The method in accordance with claim 12, wherein providing an electrical machine including a rotor assembly, a stator assembly, and a housing comprises providing the electrical machine including the rotor assembly, the stator assembly, and the housing, wherein the housing includes an annular flange extending axially inward from an inner surface of the housing, the annular flange extending from a periphery of the annular center section to facilitate isolating the stator assembly from the controller assembly.

20. The method in accordance with claim 12, wherein providing an electrical machine including a rotor assembly, a stator assembly, and a housing comprises providing the electrical machine including the rotor assembly, the stator assembly, and the housing, wherein at least one of the at least two extension portions includes one or more of the following: an inlet opening and a terminal cover.

\* \* \* \* \*